United States Patent
Murata et al.

[11] Patent Number: 5,953,198
[45] Date of Patent: Sep. 14, 1999

[54] ELECTROMAGNETIC DRIVE APPARATUS

[75] Inventors: Yukihiro Murata; Yoshinori Akinari, both of Osaka, Japan

[73] Assignee: Matsushita Electric Works, Ltd., Osaka, Japan

[21] Appl. No.: 08/876,199

[22] Filed: Jun. 16, 1997

[30] Foreign Application Priority Data

Jul. 31, 1996 [JP] Japan .................................. 8-201423
Mar. 31, 1997 [JP] Japan .................................. 9-079971

[51] Int. Cl.$^6$ ........................................ H01H 47/04
[52] U.S. Cl. ...................... 361/195; 361/159; 361/152; 361/160
[58] Field of Search ................... 361/152–156, 361/195, 194, 159.16

[56] References Cited

U.S. PATENT DOCUMENTS 5,557,494  9/1996  Ishikawa et al. ...................... 361/152

*Primary Examiner*—Fritz Fleming
*Attorney, Agent, or Firm*—Sughrue, Mion, Zinn, Macpeak & Seas, PLLC

[57] ABSTRACT

An electromagnet drive apparatus being characterized by a switching element 1 connected in series with a coil 3 of an electromagnet; a pulse signal generation circuit 16 which generates, on predetermined cycles, a pulse signal used for turning on the switching element; a regenerative circuit 4 which permits flow of a regenerated electrical current when the switch section is turned on and the switching element is turned off from a state in which the switch section and the switching element are in an on state and a source voltage is applied to the coil of the electromagnet, and which causes the power absorbing element to immediately reduce the regenerated electrical current flowing through the coil of the electromagnet when the switch section and the switching element are turned off; and a delay circuit 11 which turns on the switch section by application of the supply voltage and maintains the switch section in an on state until a predetermined period of time elapses after the application of the supply voltage has been stopped.

5 Claims, 20 Drawing Sheets

STATE OF SWITCH 17

PULSE SIGNAL

STATE OF SECOND TRANSISTOR 5

CURRENT FLOWING THROUGH COIL 3

STATE OF CONTACT U

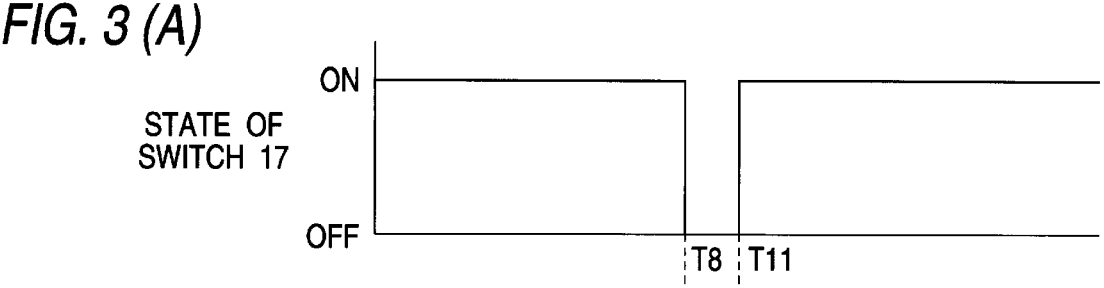
FIG. 3 (A) STATE OF SWITCH 17
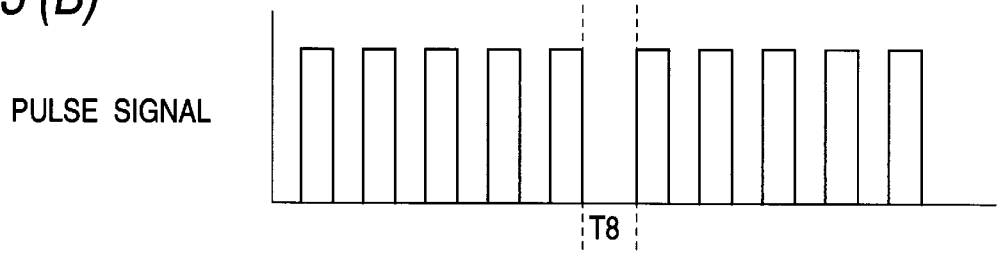
FIG. 3 (B) PULSE SIGNAL
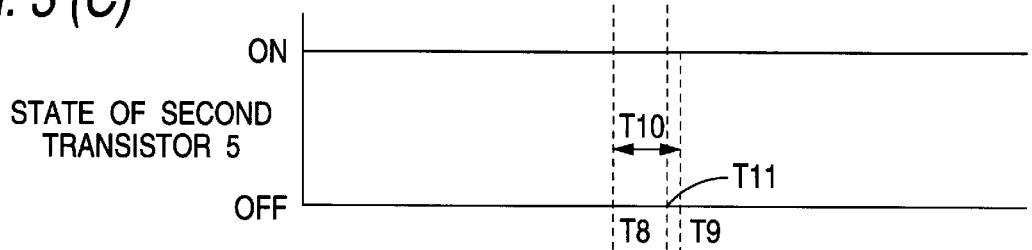
FIG. 3 (C) STATE OF SECOND TRANSISTOR 5
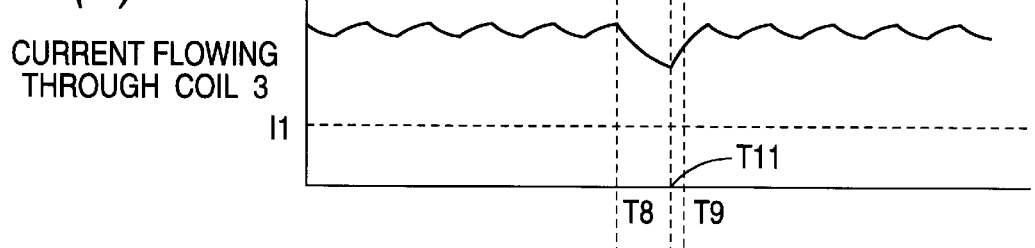
FIG. 3 (D) CURRENT FLOWING THROUGH COIL 3
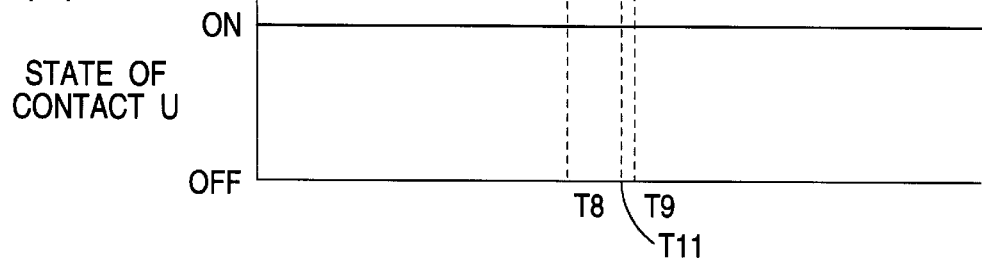
FIG. 3 (E) STATE OF CONTACT U

PRIOR ART

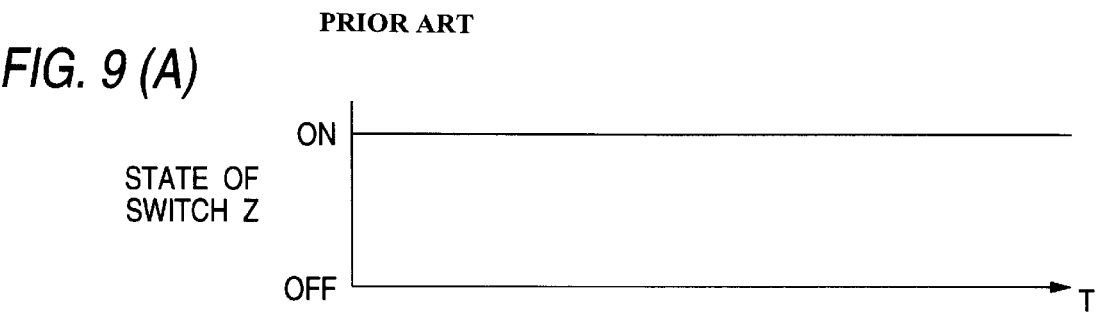
FIG. 9 (A) PRIOR ART
STATE OF SWITCH Z
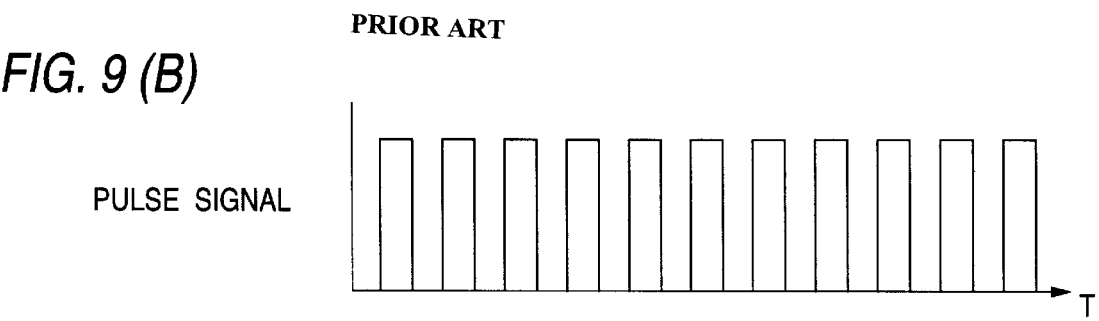
FIG. 9 (B) PRIOR ART
PULSE SIGNAL
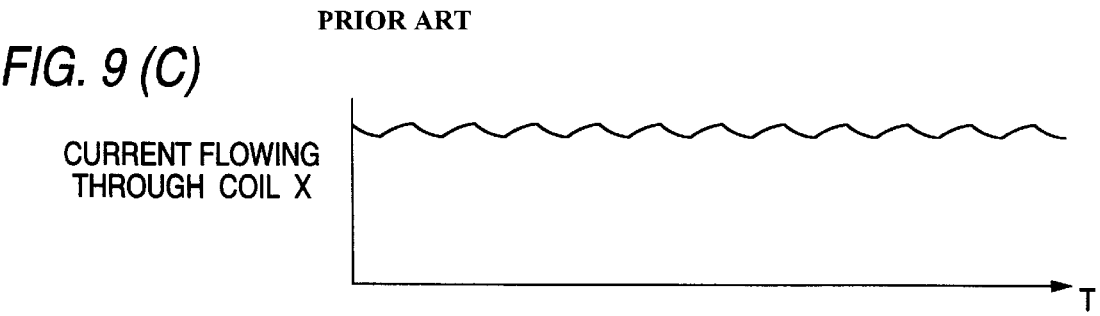
FIG. 9 (C) PRIOR ART
CURRENT FLOWING THROUGH COIL X
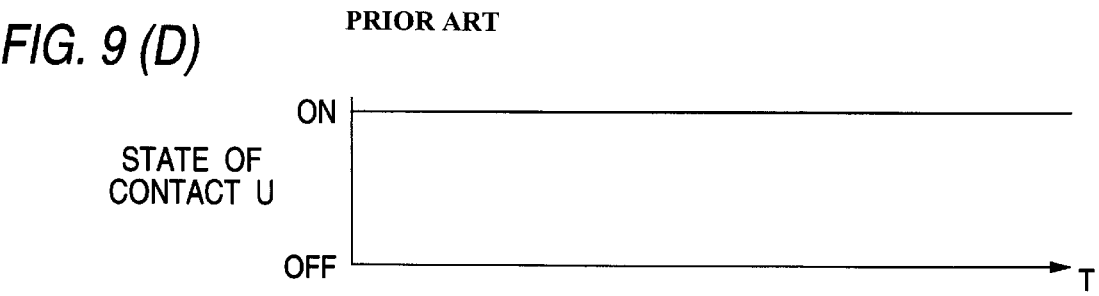
FIG. 9 (D) PRIOR ART
STATE OF CONTACT U

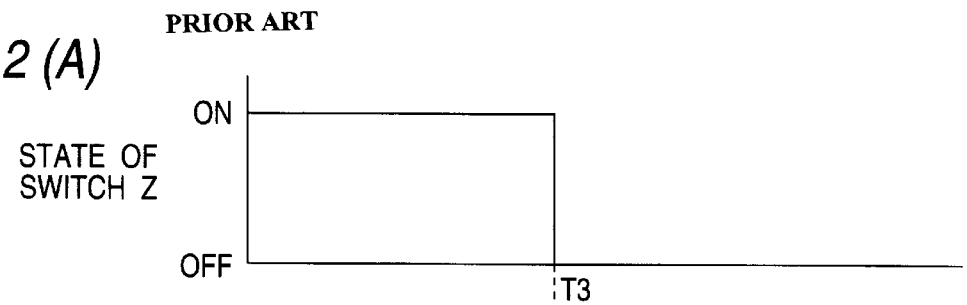
FIG. 12 (A) PRIOR ART
STATE OF SWITCH Z
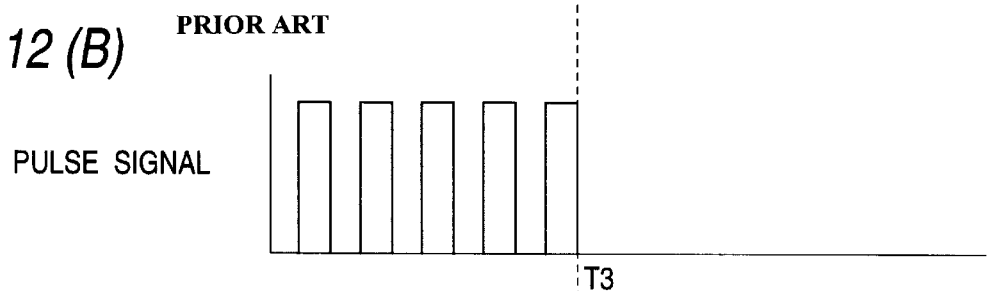
FIG. 12 (B) PRIOR ART
PULSE SIGNAL
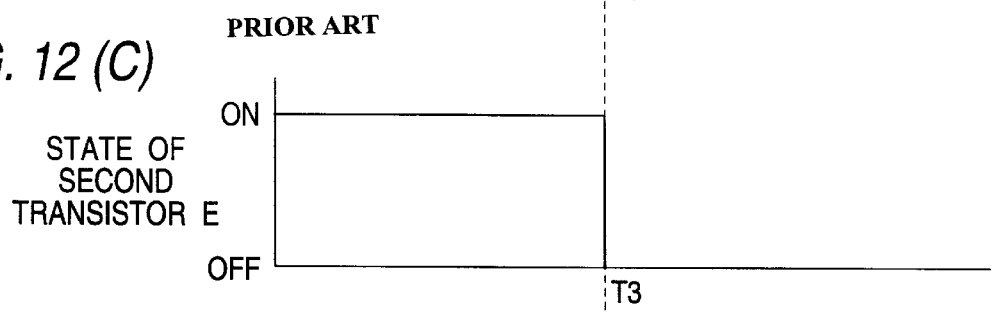
FIG. 12 (C) PRIOR ART
STATE OF SECOND TRANSISTOR E
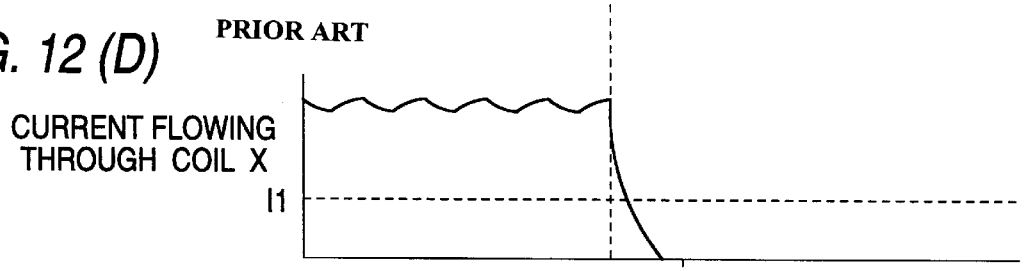
FIG. 12 (D) PRIOR ART
CURRENT FLOWING THROUGH COIL X
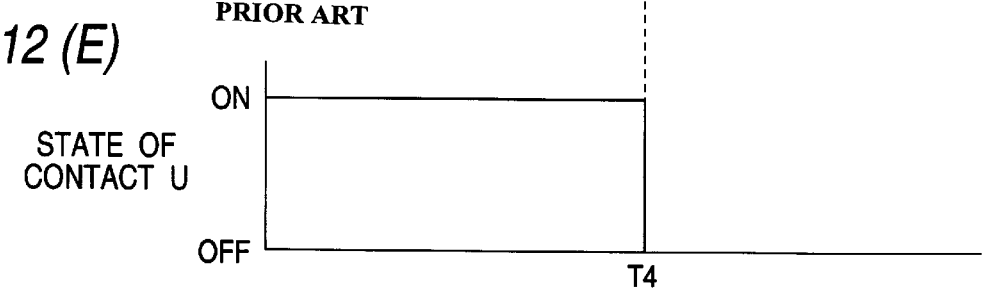
FIG. 12 (E) PRIOR ART
STATE OF CONTACT U

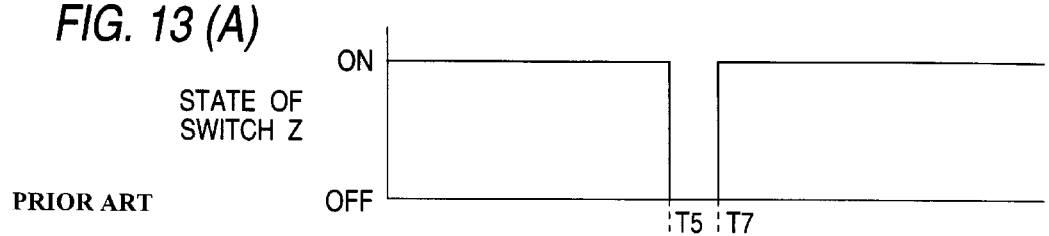
PRIOR ART
FIG. 13 (A) STATE OF SWITCH Z
PRIOR ART
FIG. 13 (B) PULSE SIGNAL
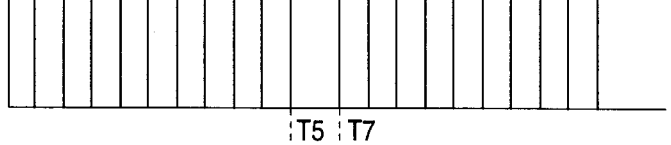
PRIOR ART
FIG. 13 (C) STATE OF SECOND TRANSISTOR E
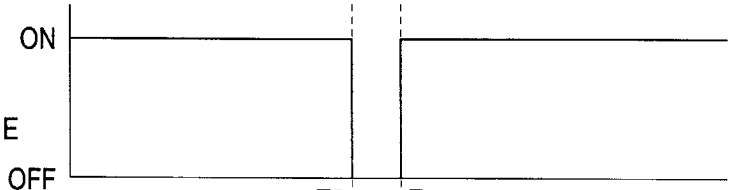
PRIOR ART
FIG. 13 (D) CURRENT FLOWING THROUGH COIL X
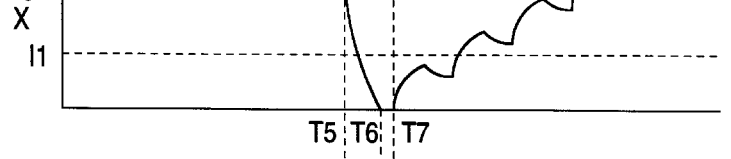
PRIOR ART
FIG. 13 (E) STATE OF CONTACT U
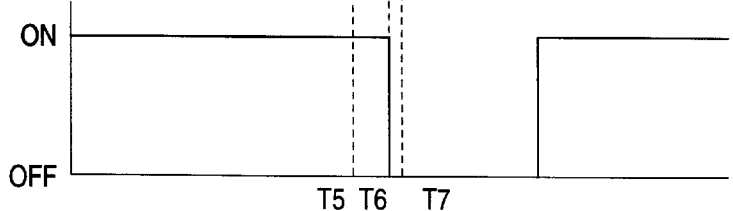
PRIOR ART
FIG. 13 (F) STATE OF CONTACT U
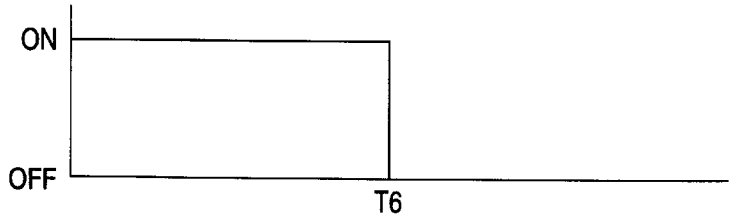

FIG. 14 PRIOR ART
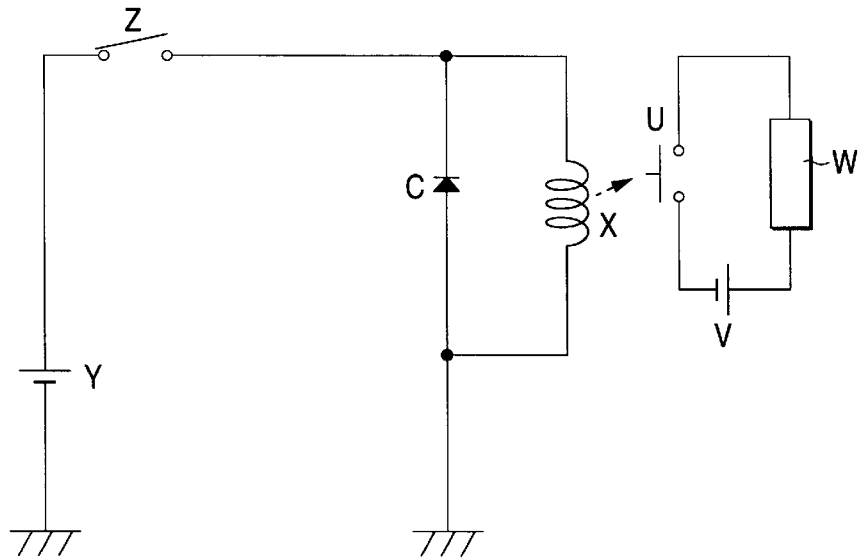
FIG. 15 (A) PRIOR ART
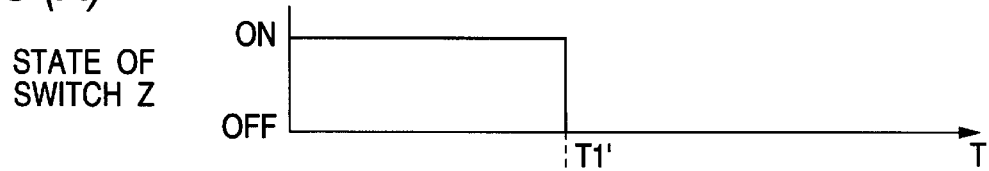
STATE OF SWITCH Z
FIG. 15 (B) PRIOR ART
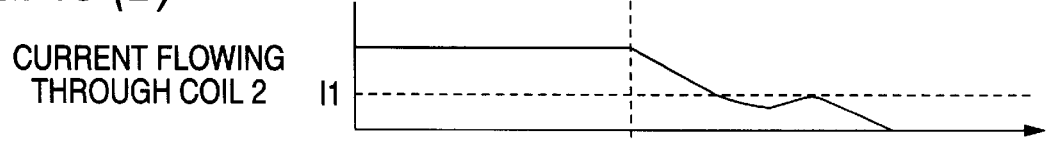
CURRENT FLOWING THROUGH COIL 2
FIG. 15 (C) PRIOR ART
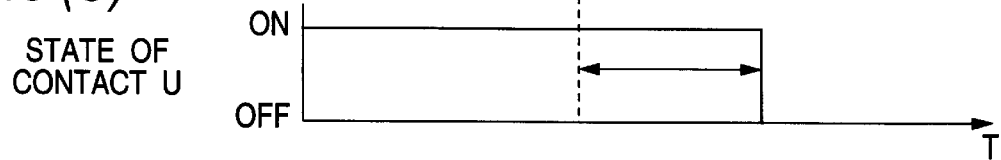
STATE OF CONTACT U FIG. 16 PRIOR ART
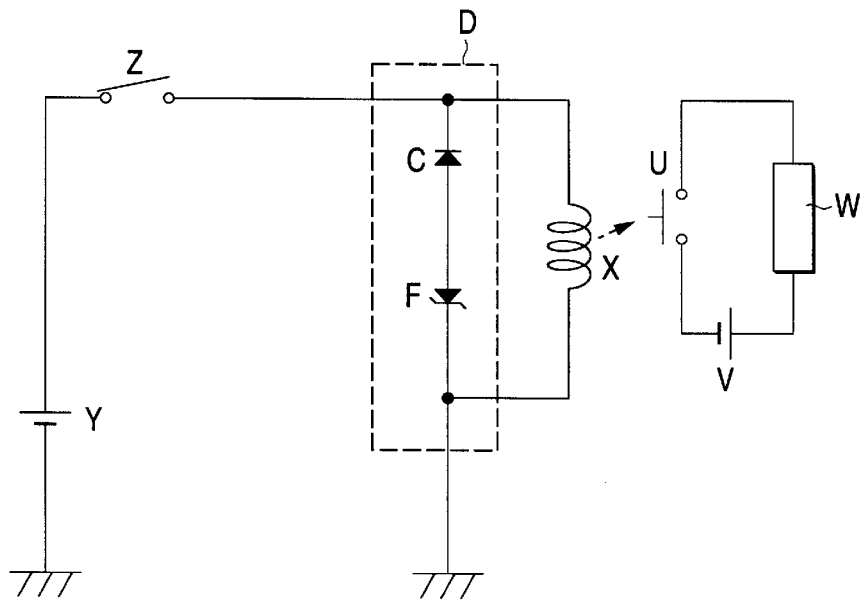
FIG. 17 (A) PRIOR ART
STATE OF SWITCH Z
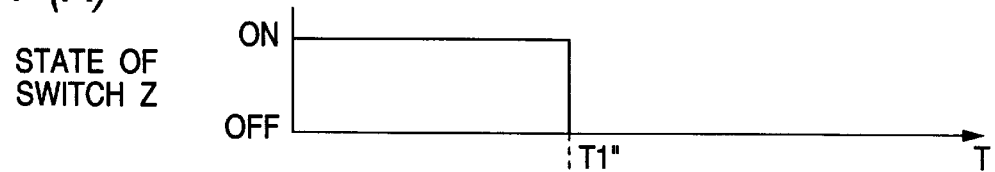
FIG. 17 (B) PRIOR ART
CURRENT FLOWING THROUGH COIL 2
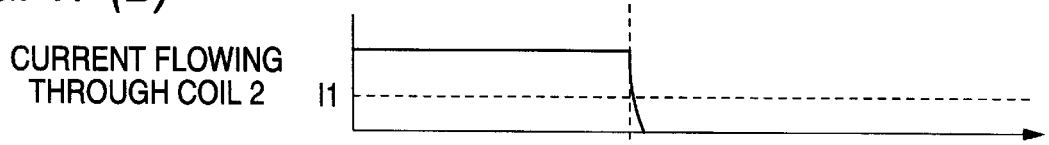
FIG. 17 (C) PRIOR ART
STATE OF CONTACT U
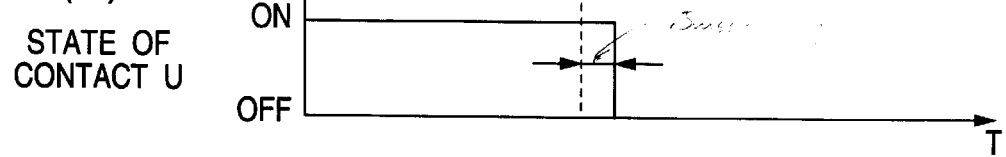

FIG. 25 (A) STATE OF SWITCH 17
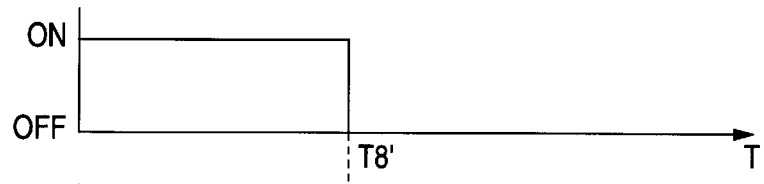
FIG. 25 (B) STATE OF SWITCH 24
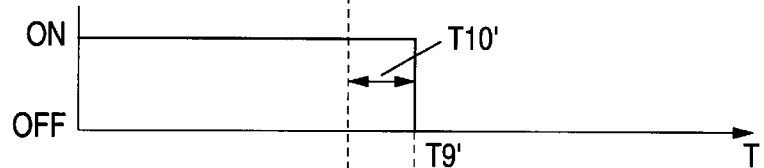
FIG. 25 (C) CURRENT FLOWING THROUGH COIL 3
FIG. 25 (D) STATE OF CONTACT U
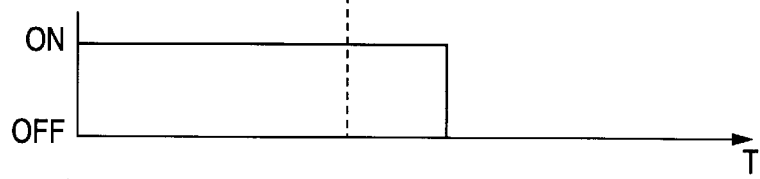
FIG. 26 (A) STATE OF SWITCH 17
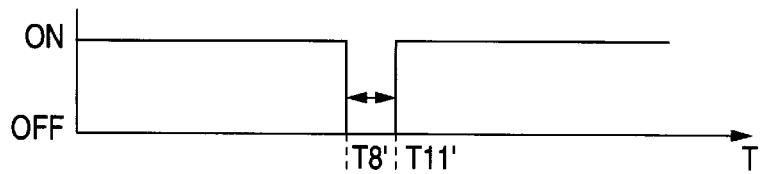
FIG. 26 (B) STATE OF SWITCH 24
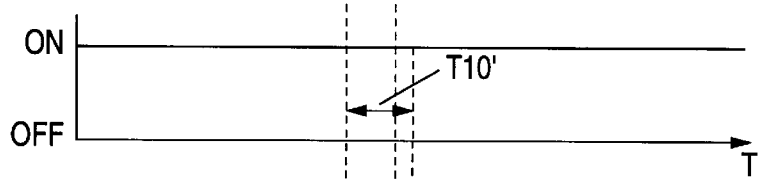
FIG. 26 (C) CURRENT FLOWING THROUGH COIL 3
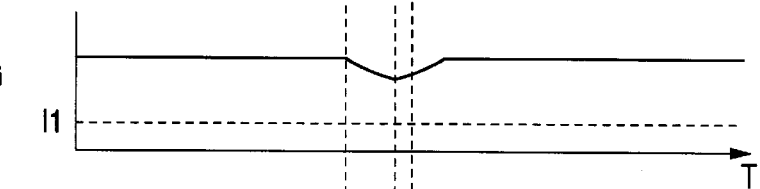
FIG. 26 (D) STATE OF CONTACT U
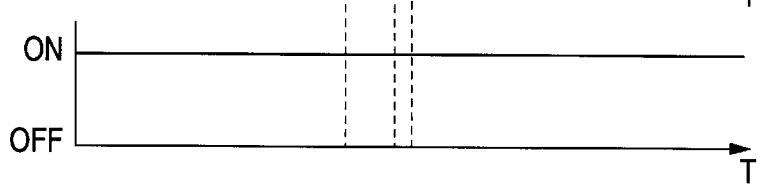

ELECTROMAGNETIC DRIVE APPARATUS

BACKGROUND OF THE INVENTION

1. Field of the Invention

The present invention relates to an electromagnet drive apparatus which drives a relay used for controlling the switching on or off of the supply of electrical power to loads in; e.g., an electromobile.

1. Related Art

In reference to FIGS. 8 through 17, the prior art will be described. FIG. 8 is a circuit diagram illustrating the configuration of an electromagnet drive apparatus in the conventional art. FIG. 9 is a timing chart of the electromagnet drive apparatus, wherein (A) represents an on state of a switch, (B) represents the state of a pulse signal, (C) represents the state of an electrical current flowing through a coil, and (D) represents the state of a contact. FIG. 10 is a timing chart of the electromagnet drive apparatus, wherein (A) represents the state of the switch which is switched to an off state from an on state during the course of an operation, (B) represents the state of the pulse signal, (C) represents the state of the electrical current flowing through the coil, and (D) represents the state of the contact. FIG. 11 is a circuit diagram illustrating the configuration of a conventional electromagnet drive apparatus. FIG. 12 is a timing chart of the electromagnet drive system, wherein (A) represents the state of the switch which is changed to an off state from an on state during the course of the operation, (B) represents the state of the pulse signal, (C) represents the state of a second transistor, (D) represents the state of the electrical current flowing through the coil, and (E) represents the state of the contact. FIG. 13 is a timing chart of the electromagnet drive apparatus, wherein (A) represents the state of the switch which changes to an off state from an on state and further changes to the on state again during the course of the operation, (B) represents the state of the pulse signal, (C) represents the state of the second transistor, (D) represents the state of the electrical current flowing through the coil, and (E) and (F) represent the states of the contact, FIG. 14 is a circuit diagram illustrating the configuration of an electromagnet drive apparatus in another conventional art relating to FIG. 8, FIG. 15 is a timing chart of the electromagnet drive apparatus, wherein (A) represents an on state of a switch, (B) represents the state of an electrical current flowing through a coil, and (C) represents the state of a contact, FIG. 16 is a circuit diagram illustrating the configuration of an electromagnet drive apparatus in another conventional art relating to FIG. 11, FIG. 17 is a timing chart of the electromagnet drive apparatus, wherein (A) represents an on state of a switch, (B) represents the state of an electrical current flowing through a coil, and (C) represents the state of a contact.

Electromagnet drive apparatuses have already been used in electromobiles or industrial equipment, wherein a plunger for closing or opening a contact is driven by an electromagnet within a relay for controlling the switching on or off of the supply of electrical power to loads.

A first example of this type of conventional electromagnet drive apparatus is illustrated in FIG. 8. This electromagnet drive apparatus is provided for a relay in order to close or open its contact U. The electromagnet drive apparatus is comprised of a field-effect transistor A which is connected in series with a coil X of the electromagnet and serves as a switching element, a pulse signal generation circuit B which generates a pulse signal for use in driving and turning on the transistor A on a predetermined cycle, and a regenerative circuit D which consists of a diode C serving as an electrical power absorbing element and is connected in parallel with the coil X so as to permit the flow of a regenerated electrical current when the field-effect transistor A is in an off state. Specifically, a switch Z is provided between a power supply Y and the coil X.

Next, the operation of the above-described electromagnet drive apparatus will be described. As illustrated in FIG. 9A, while the switch Z is in an on state, a voltage is applied to the coil X from the power supply Y, permitting flow of an electrical current through the coil X. As a result, the coil X is excited. As illustrated in FIG. 9C, the electrical current flowing through the coil X is maintained substantially constant as a result of switching on/off or so-called chopping operations in which the transistor A is turned on when it is driven on a predetermined cycle by a pulse signal in FIG. 9B received from the pulse signal generation circuit B. If the transistor A is in an on state, an electrical current flows into the coil X, so that the coil X is excited. Then, as illustrated in FIG. 9D, the contact U is turned on or is held in an on state, an electrical current flows into a load W from the power supply V. When the transistor A is turned off, the electrical current flowing through the coil X is regenerated by flowing through the diode C using a counter electromotive force developed in the coil X as a supply source. Therefore, even while the transistor A is in an off state, the coil X is excited, thereby turning on the contact U or maintaining the contact U in an on state as illustrated in FIG. 9D. Resultingly, an electrical current flows to the load W from the power supply V.

In contrast, when the switch Z is turned off as at time T1 in FIG. 10A, the electrical current flowing through the coil X gradually decreases as illustrated in FIG. 10C. At the same time, the attraction of the electromagnet also decreases gradually. When the electrical current decreases to a value less than a predetermined value I1 as illustrated in FIG. 10C, the contact U is opened as at time T2 in FIG. 10D after a slight delay (for example, 10 msec from time T1), thereby interrupting flow of an electrical current to the load W from the power supply V.

As shown in FIG. 14 and 15 (A) to (C), another conventional electromagnetic drive apparatus will be described. In FIG. 14, components which have substantially the same features as those of the components in the conventional art as shown in FIG. 8 are the same numerals, except of omitting the pulse signal generation circuit.

The operation of the device in FIG. 14, when the voltage is applied to a coil X, a direct current flows without a regenerating. If the power supply Y turns off, a regenerated electrical current flows through the regenerative diode D. As shown in FIG. 15 (A) to (C), the time of period for turning off the contact U is in 10 msec from time T1.

A second example of the same type of conventional electromagnet drive apparatus is illustrated in FIG. 11. This electromagnet drive apparatus is provided for a relay in order to close or open a contact U of the relay. The electromagnet drive apparatus is comprised of a first field-effect transistor A connected in series with a coil X of an electromagnet; a pulse signal generation circuit B which generates a pulse signal for use in driving and turning on the transistor A on a predetermined cycle; a regenerative circuit D which includes a diode C connected in series with a second transistor E and a Zener diode F, both of which are connected in parallel with each other, and is connected in parallel with the coil X so as to permit the flow of a regenerated electrical current when the field-effect transistor A is in an off state; and a third transistor G which controls the switching on or off of the second transistor E. Specifically, a switch Z is provided between a power supply Y and the coil X.

Next, the operation of the above-described electromagnet drive apparatus will be described. Similar to the first conventional example, while the switch Z is in an on state, a voltage is applied to the coil X from the power supply Y, permitting flow of an electrical current through the coil X. As a result, the coil X is excited. As in the case of the first conventional example, the electrical current flowing through the coil X is maintained constant as a result of chopping operations. While the transistor A is in an off state, the electrical current flowing through the coil X is regenerated by flowing through the regenerative circuit D using the counter electromotive force developed in the coil X as a supply source. Therefore, while the switch Z is in an on state, the coil X is excited, thereby turning on the contact U. Resultingly, an electrical current flows to the load W from the power supply V.

When the switch Z is turned off as at time T3 in FIG. 12A, the operation of the pulse signal generation circuit B is stopped as illustrated in FIG. 12B, thereby turning the first transistor A off. Further, if the switch Z is turned off, the third transistor G is also turned off, which in turn turns off the second transistor E as illustrated in FIG. 12C. At this time, the energy stored in the coil X causes an electrical current to flow to the Zener diode F and the diode C which form the regenerative circuit D. The Zener diode F quickly consumes the energy that is stored in the coil X when the switch Z is turned off, and hence the electrical current flowing through the coil X by means of the counter electromotive force decreases immediately as illustrated in FIG. 12D. Therefore, when the switch Z is turned off, the electrical current flowing through the coil X decreases immediately, so that the contact U is turned off immediately as at time T4 in FIG. 12E. As a result, the flow of the electrical current to the load W from the power supply V is interrupted. The time interval between time T3 and time T4 (for example, 0.5 msec) is shorter than the time interval between time T1 and time T2 in the first conventional example. Therefore, the second conventional example is improved as compared to the first conventional example in terms of an opening speed.

As shown in FIG. 16 and 17 (A) to (C), another conventional electromagnetic drive apparatus will be described. In FIG. 16, components which have substantially the same features as those of the components in the conventional art as shown in FIG. 11 are the same numerals, except of omitting the pulse signal generation circuit.

The operation of the device in FIG. 16 when the voltage is applied to a coil X, a direct current flows without a regenerating. If the power supply Y turns off, a regenerated electrical current flows through the regenerative diode D and Zener diode F. As shown in FIG. 17 (A) to (C), the time of period for turning off the contact U is in 0.5 msec from time T1".

In the electromagnet drive apparatus of the previously-described first conventional example, the electrical current flowing through the coil X is regenerated by flowing through the diode C using the counter electromotive force developed in the coil X as a supply source when the switch Z is turned off. However, the electrical current does not decrease very immediately and therefore continues flowing through the coil X by way of the diode C for a while. Consequently, the electromagnet remains in an on state, which may results in the risk of delayed opening of the contact of the relay. More specifically, the electrical current flowing through the coil X decreases mildly, and the attraction of the electromagnet also decreases mildly. Therefore, the opening speed of the contact of the relay is slow, thereby resulting in low breaking capability. For the case of such a slow opening speed, even in the event that it is necessary to immediately open the contact for reasons of a short circuit occurred in the circuit of the load W, there is a risk of a dangerous condition because the contact is not opened for a while. More specifically, for example, in case an electromobile causes a car accident or there are accidents to industrial equipment, a dangerous condition will result from a short circuit unless a relay provided in a circuit of a motor which is a power source is opened immediately.

In the electromagnet drive apparatus of the second conventional example, the Zener diode F immediately consumes the energy stored in the coil X when the switch Z is turned off, and the electrical current that flows through the coil X by means of the counter electromotive force decreases immediately. Therefore, the electromagnet can be turned off immediately. In other words, the electrical current flowing through the coil X decreases immediately, and the attraction of the electromagnet also decreases immediately. Therefore, the opening speed of the contact of the relay is improved, thereby resulting in improved breaking capability.

However, in this electromagnet drive apparatus, a contact switch or a semiconductor switch is used as the switch Z for controlling the switching on or off of the application of a supply voltage. For the case of the contact switch, there is a risk of momentarily erroneous switching off of the switch due to physical shock. Further, for the case of the semiconductor switch, there is a risk of momentarily erroneous switching off of the switch due to external noise or to faulty operations induced by a signal used for actuating the switch. More specifically, in a case where such an electromagnet drive apparatus is used with an electromobile or the like, the contact may be momentarily opened by vibrations resulting from the driving of the electromobile if the switch Z is a contact switch. Further, even in the case where the switch Z is a semiconductor switch, the switch may be momentarily interrupted by external noise caused by variations in the external environment associated with the driving of the electromobile.

As described above, even if there is unintentional turning off of the switch Z, there is a risk of immediate and erroneous switching off of the electromagnet, thereby resulting in abnormal operations of the contact of the relay.

More specifically, as illustrated in FIGS. 13A to 13C, even in a case where the switch Z is turned off unintentionally at time T5 for some reasons, and where the switch Z is turned on again at time T7 (for example, after 1 msec from T5) immediately after the switch Z has been turned off, the electrical current flowing through the coil X decreases immediately as illustrated in FIG. 13D. As illustrated in FIG. 13E, the contact U is opened at time T6 between time T5 and time T7 (for example, after 0.5 msec from T5).

In a case where the electrical current to maintain the contact U in an on state is set to a value larger than an electrical current required to close the contact U, if an electrical current which is larger than the predetermined value 11 and is necessary to turn the power on flows again as illustrated in FIG. 13E, the contact point U is turned on. In contrast, if an electrical current larger than the electrical current that maintains the contact point U in an on state is necessary to close the contact point U, the contact point U is not closed by the flow of the electrical current illustrated in FIG. 13D. As a result, the contact point U is continuously maintained in an off state after time T6 as illustrated in FIG. 13F.

The present invention has been conceived in terms of the foregoing drawbacks in the background art, and the object of the present invention is to provide an electromagnet drive apparatus which is capable of turning off an electromagnet immediately at a desired time and prevents the electromagnet from being erroneously turned off even if there is momentarily interruption of the supply of electrical power.

To solve the foregoing drawbacks, an electromagnet drive apparatus, according to the present invention, comprises: a switching element connected in series with a coil of an electromagnet; a pulse signal generation circuit which generates, on predetermined cycles, a pulse signal used for turning on the switching element; a diode connected in series with a parallel circuit which includes a switch section and a power absorbing element; a regenerative circuit which permits flow of a regenerated electrical current when the switch section is turned on and the switching element is turned off from a state in which the switch section and the switching element are in an on state and a source voltage is applied to the coil of the electromagnet, and which causes the power absorbing element to immediately reduce the regenerated electrical current flowing through the coil of the electromagnet when the switch section and the switching element are turned off; and a delay circuit which turns on the switch section by application of the supply voltage and maintains the switch section in an on state until a predetermined period of time elapses after the application of the supply voltage has been stopped.

An electromagnet drive apparatus, according to the present invention, comprises: the switch section including a transistor connected in parallel with the power absorbing element; a phototransistor connected between a base and a collector of the transistor; and a light-emitting diode which emits light so as to control the switching on or off of the phototransistor.

An electromagnet drive apparatus, according to the present invention, comprises: a switching element connected in series with a coil of an electromagnet; a pulse signal generation circuit which generates, on predetermined cycles, a pulse signal used for turning on the switching element; a regenerative circuit which includes a diode connected in series with a parallel circuit comprised of a switch section and a power absorbing element and is connected in parallel with a coil such that a regenerated electrical current flows when the switching element is in an off state; a phototransistor connected between a base and a collector of the transistor to control the switching on or off of the transistor; a light-emitting diode which emits light so as to control the switching on or off of the phototransistor; and a delay circuit which continues feeding an electrical current to the light-emitting diode until a predetermined period of time elapses after the application of the power has been stopped.

An electromagnet drive apparatus, according to the present invention, comprises: the delay circuit including: a capacitor which is capable of being charged during the application of the supply voltage and discharging an electrical current to the switch section until a predetermined period of time elapses after the application of the supply voltage has been stopped; and a Zener diode connected in parallel with the capacitor.

An electromagnet drive apparatus, according to the present invention, comprises: the delay circuit including a capacitor which is capable of being charged during the application of the supply voltage and discharging an electrical current to the switch section until a predetermined period of time elapses after the application of the supply voltage has been stopped; and the electromagnet drive apparatus being characterized by further comprising: a supply voltage detection circuit which applies a given charging voltage to the capacitor if the supply voltage is higher than a predetermined voltage but does not apply a voltage to the capacitor if the supply voltage is lower than a predetermined voltage.

An electromagnet drive apparatus, according to the present invention, comprises: a reference voltage circuit which outputs a reference voltages and a comparator which compares the reference voltage with the voltage across the capacitor and outputs a control signal for controlling the switching on or off of the switch section.

BRIEF DESCRIPTION OF THE DRAWINGS

FIGS. 3(A) to 3(E) are timing charts of the electromagnet drive apparatus of the present invention, wherein 3(A) represents the state of the switch which changes to an off state from an on state and further changes to the on state again during the course of the operation, 3(B) represents the state of the pulse signal, 3(C) represents the state of the second transistor, 3(D) represents the state of the electrical current flowing through the coil, and 3(E) represents the state of the contract; the coil, and (E) represent the states of the contact;

FIGS. 9(A) to 9(D) are timing charts of the electromagnet drive apparatus of the conventional art, wherein 9(A) represents an on state of switch, 9(B) represents the state of a pulse signal, 9(C) represents the state of an electrical current flowing through a coil, and 9(D) represents the state of a contact;

FIGS. 12(A) to 12(E) are timing charts of the electromagnet drive system of the conventional art, where in 12(A) represents the state of the switch which is changed to an off state form an on state during the course of the operation, 12(B) represents the state of the pulse signal, 12(C) represents the state of a second transistor, 12(D) represents the state of the electrical current flowing through the coil, and 12(E) represents the state of the contact; and FIGS. 13(A) to 13(F) are timing charts of the electromagnet drive apparatus of the conventional art, wherein 13(A) represents the state of the switch which changes to an off state from an on state and further changes to the on state again during the course of the operation, 13(B) represents the state of the pulse signal, 13(C) represents the state of the second transistor, 13(D) represents the state of the electrical current flowing through the coil, and 13(E) and 13(F) represent the states of the contact.

FIG. 14 is a showing a circuit diagrams of another conventional electromagnetic drive apparatus;

FIGS. 15(A) to 15(C) are timing charts of another conventional electromagnetic drive apparatus;

FIG. 16 is a showing a circuit diagrams of another conventional electromagnetic drive apparatus;

FIGS. 17(A) to 17(C) are timing charts of another conventional electromagnetic drive apparatus;

FIGS. 25(A) to 25(D) and FIGS. 26(A) to 26(D) are timing charts of another modified embodiment of the present invention.

DETAILED DESCRIPTION OF THE PREFERRED EMBODIMENTS

First Embodiment

An electromagnet drive apparatus according to a first embodiment of the present invention will be described in reference to FIG. 1 to 3.

Figure 1:
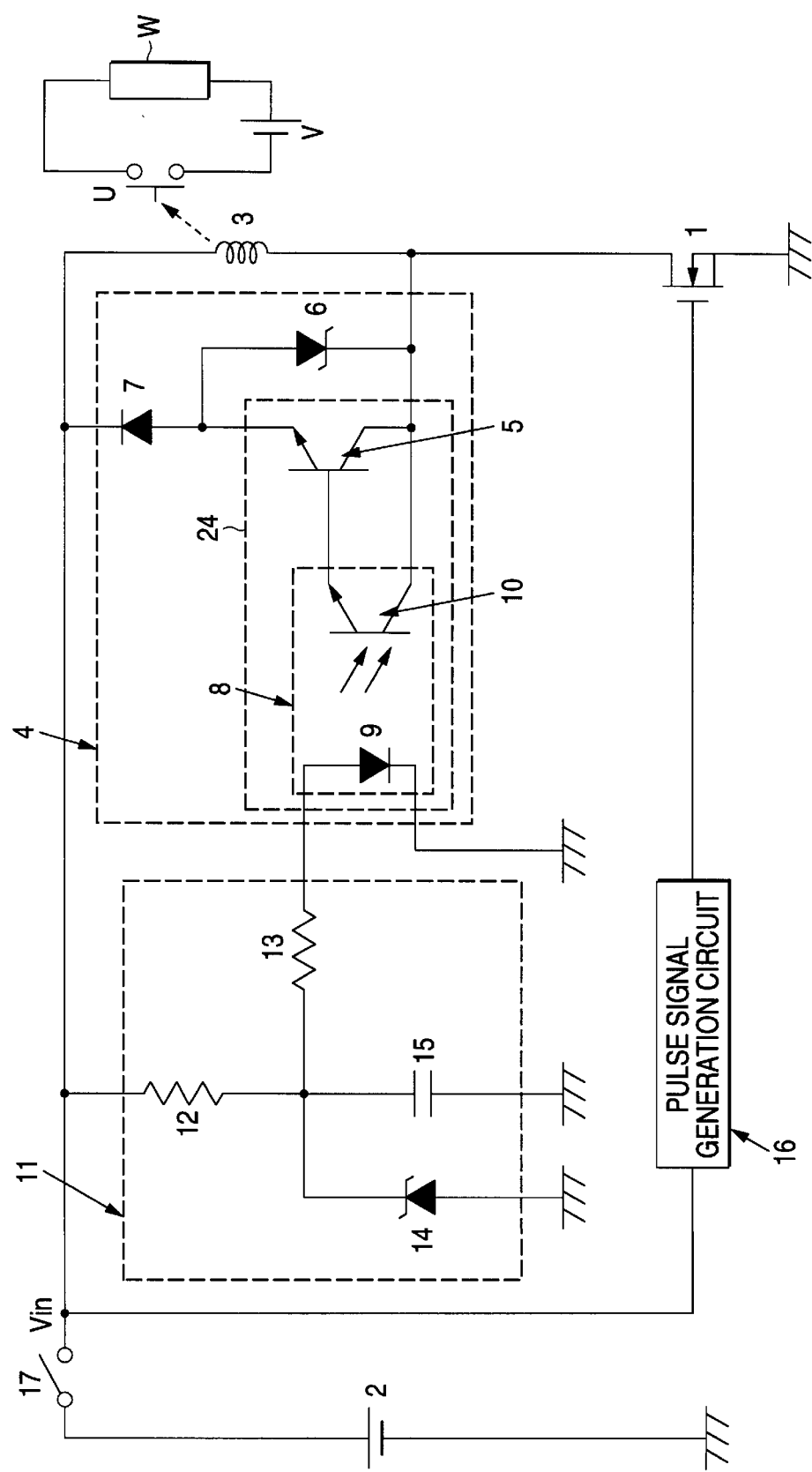
FIG. 1 is a circuit diagram illustrating a first embodiment of the present invention.
Figure 2:
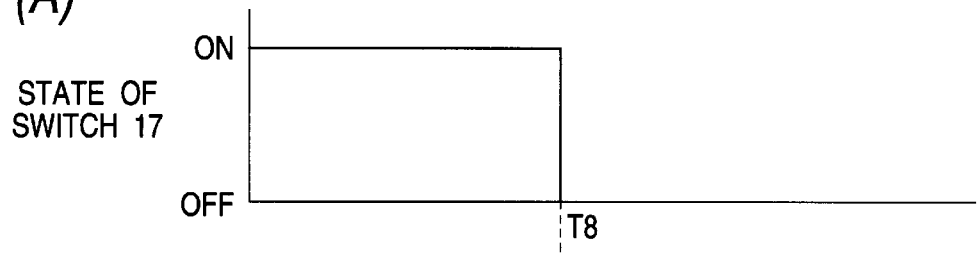
FIGS. 2(A) to 2(E) are timing charts of the electromagnet drive apparatus of the present invention, wherein 2(A) represents the state of a switch which changes to an off state from an on state during the course of an operation, 2(B) represents the state of a pulse signal, 2(C) represents the state of a second transistor, 2(D) represents the state of an electrical current flowing through a coil, and 2(E) represents the state of a contract.
Figure 2:
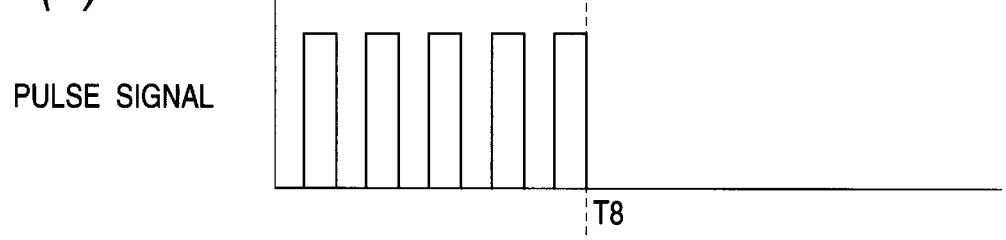
Figure 2:
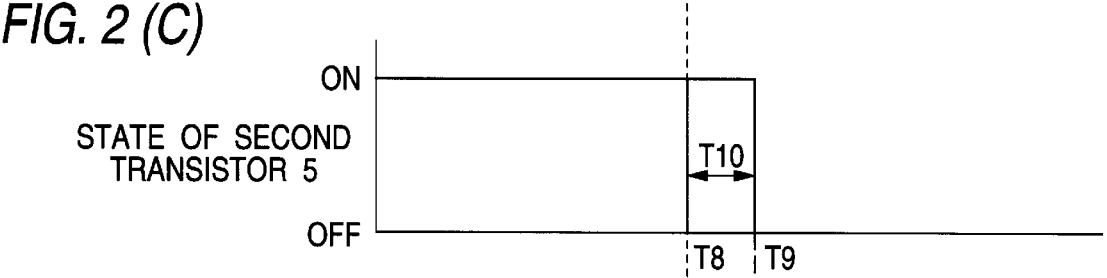
Figure 2:
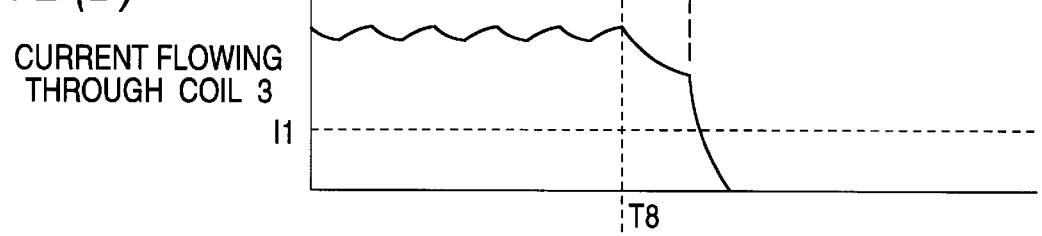
Figure 2:
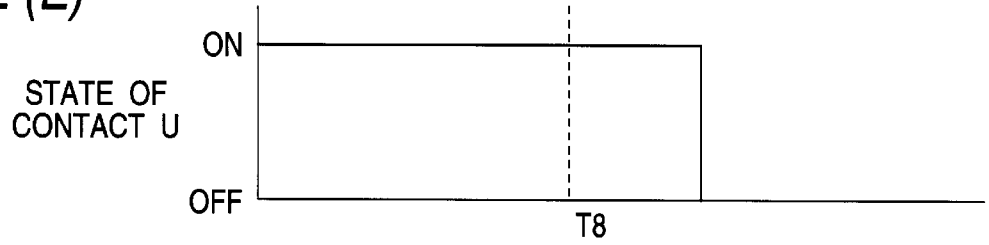

FIG. 1 is a circuit diagram illustrating the configuration of an electromagnet drive apparatus, and FIG. 2 is a timing chart of the electromagnet drive apparatus, wherein (A) represents the state of a switch which changes to an off state from an on state during the course of an operation, (B) represents the state of a pulse signal (a voltage between a gate and source in a switching element), (C) represents the state of a second transistor, (D) represents the state of an electrical current flowing through a coil, and (E) represents the state of a contact. FIG. 3 is a timing chart of the electromagnet drive apparatus, wherein (A) represents the state of the switch which changes to an off state from an on state and further changes to the on state again during the course of the operation, (B) represents the state of the pulse signal (a voltage between a gate and source in a switching element), (C) represents the state of the second transistor, (D) represents the state of the electrical current flowing through the coil, and (E) represent the states of the contact.

This electromagnet drive system is provided for a relay in order to open and close its contact U.

Reference numeral 1 designates a first field-effect transistor (a switching element) connected in series with a coil 3 of an electromagnet to which a supply voltage Vin of a power supply 2 is applied. This first field-effect transistor is capable of controlling the switching on or off of the supply of an electrical current to the coil 3 from the power supply 2.

Reference numeral 4 designates a regenerative circuit comprised of a diode 7 connected in series with a parallel circuit which includes a switch section 24 and a first Zener diode 6 corresponding to a power absorbing element.

The switch section 24 is comprised of a photocoupler 8 and a second transistor 5. The photocoupler 8 is made up of a light-emitting diode 9 and a phototransistor 10 whose switching operation is controlled by light emitted from the light-emitting diode 9.

More specifically, the diode 7 has its anode connected to an anode of the first Zener diode 6 as well as to an emitter of the second transistor 5. The regenerative circuit 4 is connected in parallel with the coil 3. The light-emitting diode 9 has its anode connected to one end of a discharge resistor 13 of the delay circuit 11, which will be described later. The cathode of the light-emitting diode 9 is grounded. The phototransistor 10 has its emitter connected to the base of the second transistor 5 and has its collector connected to the collector of the second transistor 5. The collector of the second transistor is also connected to the cathode of the first Zener diode 6.

Reference numeral 11 designates a delay circuit which is comprised of a charge resistor 12, the discharge resistor 13, a second Zener diode 14, and a capacitor 15. More specifically, the charge resistor 12 is connected at one end to the coil 3 and is connected at the other end to the other end of the discharge resistor 13. The second Zener diode 14 has its cathode connected to the charge resistor 12 as well as to the other end of the discharge resistor 13. The anode of the second Zener diode 14 is grounded. The capacitor 15 is grounded at one end and is connected at the other end to the cathode of the second Zener diode 14. In short, the capacitor 15 is connected in parallel with the second Zener diode 14.

Reference numeral 16 designates a pulse signal generation circuit which operates upon receipt of the supply voltage Vin from the power supply 2 and is connected to the gate of the first transistor 1. As illustrated in FIGS. 2B and 3B, the pulse signal generation circuit 16 produces a pulse signal to drive and turn on the first transistor 1 on predetermined cycles.

Reference numeral 17 designates a switch which is comprised of a contact switch or a semiconductor switch and is used for switching on or off the application of the supply voltage Vin from the power supply 2 to the coil 3, the delay circuit 11, and the pulse signal generation circuit 16.

Next, the operation of the electromagnet drive apparatus having the foregoing circuit configuration will be described. When the switch 17 is turned on, the supply voltage Vin is applied from the power supply 2 to the coil 3, the delay circuit 11, and the pulse signal generation circuit 16, respectively. At the outset, the pulse signal generation circuit 16 increases a duty ratio so as to increase an exciting current, so that a drive force is increased to momentarily turn on the contact U. Once the contact U has been turned on, only a small amount of exciting current is required to maintain the contact U in an on state. Therefore, the pulse signal generation circuit 16 decreases the duty ratio so as to save energy. The initial coil exciting current is always larger than the predetermined current I1 (opening current).

The capacitor 15 of the delay circuit 11 is charged with electric charges via the charge resistor 12 until the voltage across the capacitor 15 becomes equal to a Zener voltage of the second Zener diode 14. If the voltage across the capacitor 15 becomes higher than an operating voltage of the light-emitting diode 9 during the course of charging of the capacitor 15, the light-emitting diode 9 emits light. The phototransistor 10 is turned on by the thus-emitted light, which in turn turns on the second transistor 5.

As illustrated in FIG. 2A, if the switch 17 is turned on, the pulse signal generation circuit 16 operates simultaneously with the previously described series of operations and outputs a pulse signal to drive and turn on the first transistor 1 on predetermined cycles as illustrated in FIG. 2B (for example, a frequency is 20 KHz, dependant upon the coil inductance and the resistance. As a result, the switching on or off of the first transistor 1 is controlled, whereby an electrical current flowing to the coil 3 is controlled in a chopping manner so as to be substantially maintained to a given value. More specifically, while the first transistor 1 is in an on state, an electrical current is supplied to the coil 3 from the power supply 2, thereby turning on the electromagnet. In contrast, while the first transistor 1 is in an off state, the electrical current flowing through the coil 3 is regenerated through a series circuit, which consists of the second transistor 5 being in an on state and the diode 7, in the manner as previously described using the counter electromotive force developed in the coil 3 as a supply source. Through the series of previously-described operations, the coil 3 is excited while the switch 17 is in an on state. As illustrated in FIG. 2E, the contact U is turned on, whereby an electrical current flows to the load W from the power supply V.

Next, when the switch 17 is turned off as at time T8 in FIG. 2A, the operation of the pulse signal generation circuit 16 is stopped as illustrated in FIG. 2B, thereby turning off the first transistor 1. Simultaneously with the series of operation, the electrical charges stored in the capacitor 15 are discharged via the discharge resistor 13. Accordingly, the voltage across the capacitor 15 decreases to zero from the Zener voltage of the second Zener diode 14. While the voltage across the capacitor 15 is higher than the operating voltage of the light-emitting diode 9, the light-emitting diode 9 continues emitting light, thereby turning on the phototransistor 10. Associated with this, the second transistor 5 is maintained in an on state (FIG. 2C). At this time, as illustrated in FIG. 2D, the energy stored in the coil 3 causes the electrical current to continuously flow through a direct circuit which consists of the second transistor 5 and the diode 7 and is connected in parallel with the coil 3. Consequently, as illustrated in FIG. 2E, the electromagnet is still maintained in the on state.

As indicated by time T9 in FIG. 2C, if a predetermined period of time T10 (for example, 1.5 msec which depends upon the coil inductance and the resistance) has elapsed since the switch 17 was turned off, and if the voltage across the capacitor 15 becomes smaller than the operating voltage of the light-emitting diode 9, the light-emitting diode 9 stops emitting light, turning off the phototransistor 10. Resultingly, as illustrated in FIG. 2C, the second transistor 5 is turned off, so that the energy stored in the coil 3 is consumed by flowing an electrical current to a series circuit which consists of the first Zener diode 6 and the diode 7 and is connected in parallel with the coil 3. The first Zener diode 6 consumes the energy stored in the coil 3 immediately, whence the electrical current flowing through the coil 3 decreases immediately, turning off the electromagnet. For example, as shown in FIG. 2E, a period of time of turning off the electromagnet is 2 msec from the time T8.

In this electromagnet drive apparatus, even if there is unintentional and momentary interruption of the application of a voltage from the power supply 2, the delay circuit 11 continues flowing an electrical current to the light-emitting diode 9 until the predetermined period of time T10 elapses, and hence the light-emitting diode 9 continues emitting light. Therefore, the phototransistor 10 is maintained in an on state, and the second transistor 5 is also maintained in an on state. As a result, a regenerated electrical current can be delivered to the coil 3 even if the second transistor 5 is turned on. The coil 3 is continuously excited, thereby turning on the electromagnet. Further, after the predetermined period of time T10 has elapsed, the electrical current flowing to the coil 3 is regenerated by flowing through the second Zener diode 6 of the regenerative circuit 4 using the counter electromotive force developed in the coil 3 as the supply source, and the regenerated electrical current thereby decreases immediately. In contrast, as illustrated in FIG. 3A, if the switch 17 is turned off at time T8, and if it is turned on again at time T11 before a lapse of the period of time T10 (for example, 1 msec from the time T8), the second transistor 5 is maintained in an on state as illustrated in FIG. 2C. Therefore, as illustrated in FIG. 2D, the regenerated electrical current flows to the coil 3 until the supply of an electrical current to the coil 3 from the power supply 2 is resumed, thereby energizing the coil 3. The contact U is maintained in an on state, and an electrical current flows to the load W from the power supply V.

Resultingly, the electromagnet can be turned off immediately, and it is possible to prevent the electromagnet from being erroneously turned off even when there is momentary opening of the switch 17.

The voltage across the capacitor 15 connected in parallel with the second Zener diode 14 is maintained at the Zener voltage even if there are variations in the supply voltage Vin. Therefore, the amount of electrical charges stored in the capacitor 15 becomes stable, whence the amount of electrical charges discharged to the light-emitting diode 9 becomes also constant after the application of the voltage has been stopped, thereby resulting in a constant discharge duration. Accordingly, it is possible to control a predetermined time period during which the light-emitting diode 9 continues emitting light by setting the capacitance of the capacitor 15 as required.

Second Embodiment

Figure 4:
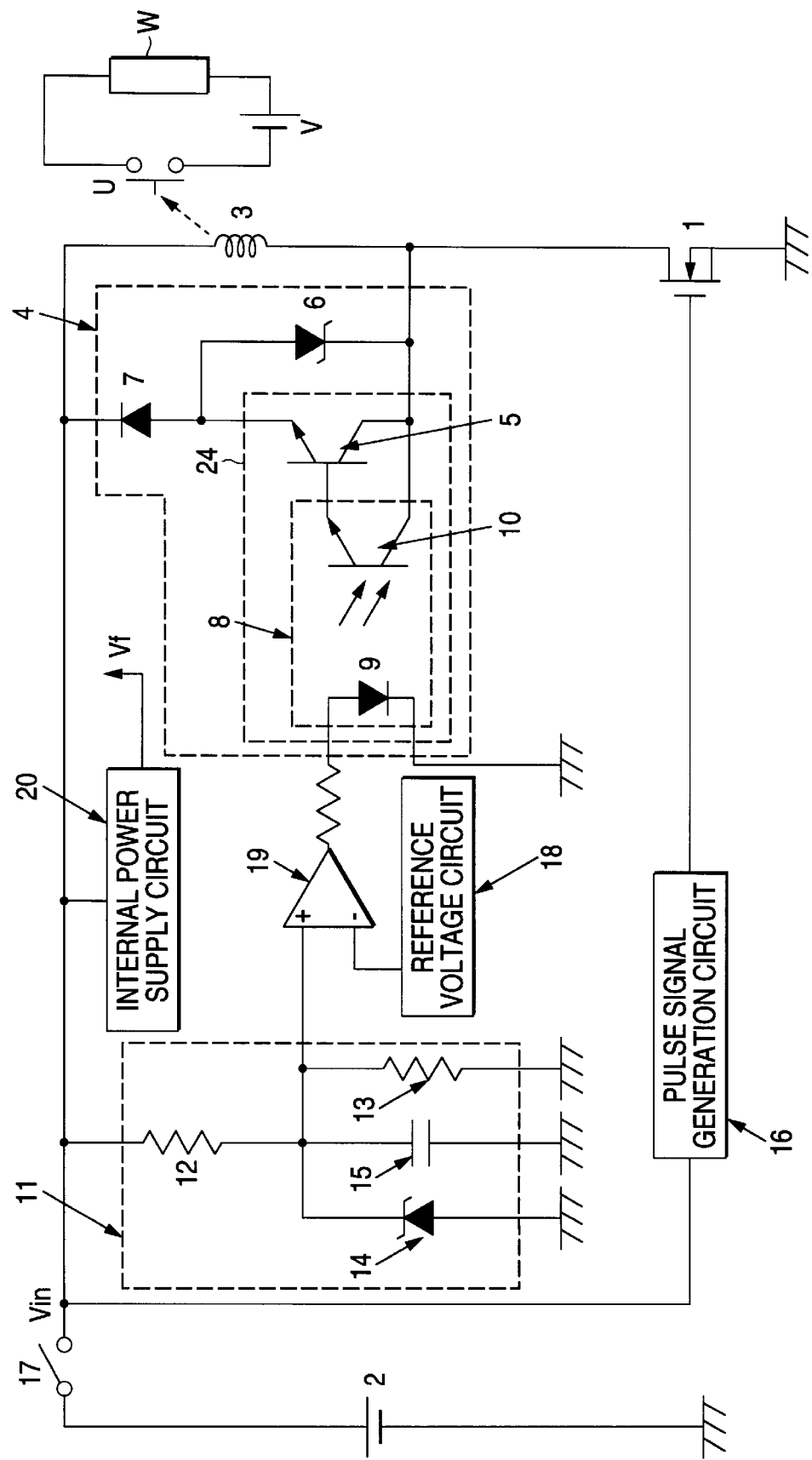
FIG. 4 is a circuit diagram illustrating the configuration of an electromagnet drive apparatus according to a second embodiment of the present invention.

FIG. 4 is a circuit diagram illustrating the configuration of an electromagnet drive apparatus. In FIG. 4, components which have substantially the same features as those of the components in the first embodiment are assigned the same reference numerals, and only the different components are illustrated.

In addition to the components in the first embodiment, the electromagnet drive apparatus of the second embodiment is provided with a reference voltage circuit 18 for outputting a reference voltage, a comparator 19 which compares the reference voltage with a voltage across the capacitor 15 and outputs a light emission control signal for controlling a light-emitting state of the light-emitting diode 9, and an internal power supply circuit 20 which drives the comparator 19 and outputs an internal supply voltage Vf for activating the reference voltage circuit 18.

More specifically, the comparator 19 has its noninvertible output terminal connected to the other terminal of the capacitor 15 and has its invertible output terminal connected to the reference voltage circuit 18. An output terminal of the comparator 19 is connected to the anode of the light-emitting diode 9 through the resistance. The comparator 19 compares the voltage across the capacitor 15 with the reference voltage. If the voltage across the capacitor 15 is higher than the reference voltage, the comparator 19 outputs a "high-level" light emission control signal to the light-emitting diode 9. In contrast, if the voltage across the capacitor 15 is lower than the reference voltage, the comparator 19 outputs a "low-level" light emission control signal to the light-emitting diode 9.

The discharge resistor 13 is grounded at one end and is connected at the other end to the other terminal of the capacitor 15. In short, the discharge resistor 13 is connected in parallel with the capacitor 15.

The internal power supply circuit 20 continues outputting the internal power supply voltage Vf for a while by means of the energy stored in it while the switch 17 is in an on state even if the switch 17 is turned off. Therefore, even if the switch 17 is turned off, it is possible to cause the comparator 19 and the reference voltage circuit 18 to operate continuously for a while.

Next, the operation of the above-described electromagnet drive apparatus will be described. As in the case of the first embodiment, when the switch 17 is turned on, the supply voltage Vin of the power supply 2 is applied to the coil 3, the delay circuit 11, and the pulse signal generation circuit 16, respectively. The capacitor 15 of the delay circuit 11 is charged via the charge resistor 12. If the voltage across the capacitor 15 becomes higher than the reference voltage of the reference voltage circuit 18 during the course of the charging of the capacitor 15, the comparator 19 outputs the "high-level" light emission control signal, so that the light-emitting diode 9 emits light. The phototransistor 10 is then turned on, and the second transistor 5 is also turned on.

As in the case of the first embodiment, while the switch 17 is in an on state, the pulse signal generation circuit 16 operates and produces a pulse signal simultaneously with the series of above-described operations. The first transistor 1 is turned on or off, whereby the electrical current flowing to the coil 3 is controlled in a chopping manner and is maintained at substantially a constant value. As a result, the electromagnet is maintained in an on state.

Next, when the switch 17 is turned off, the operation of the pulse signal generation circuit 16 is stopped, and the first transistor 1 is turned off. Simultaneously with the series of operations, the electrical charges stored in the capacitor 15 are discharged via the discharge resistor 13. Therefore, the voltage across the capacitor 15 decreases to zero from the Zener voltage of the second Zener diode 14. While the voltage across the capacitor 15 is larger than the reference voltage of the reference voltage circuit 18, the comparator 19 outputs the "high-level" light emission control signal from its output terminal to the light-emitting diode 9, so that the light-emitting diode 9 continues emitting light. The phototransistor 10 is turned on, which in turn maintains the second transistor 5 in the on state. At this time, the energy stored in the coil 3 still continuously causes an electrical current to flow through a series circuit which consists of the second transistor 5 and the diode 7 and is connected in parallel with the coil 3, whereby the electromagnet is maintained in the on state.

If a predetermined time has elapsed while the switch 17 is in an off state, and if the voltage across the capacitor 15 becomes lower than the reference voltage of the reference voltage circuit 18, the comparator 19 outputs from its output terminal the "low-level" light emission control signal to the light-emitting diode 9, so that the light-emitting diode 9 stops emitting light. As a result, the phototransistor 10 is turned off, which in turn brings the second transistor 5 into an off state. The energy stored in the coil 3 is consumed by flowing an electrical current to a series circuit which consists of the first Zener diode 6 and the diode 7 and is connected in parallel with the coil 3. The first Zener diode 6 consumes the energy stored in the coil 3 immediately, as a result of which the electrical current flowing through the coil 3 decreases immediately, thereby turning off the electromagnet.

As in the case of the first embodiment, the electromagnet drive apparatus having the previously-described configuration is capable of turning off the electromagnet immediately at a desired time without a malfunction.

Further, as is the case with the first embodiment, it is possible to control a predetermined time period during which the light-emitting diode 9 continues emitting light by setting the capacitance of the capacitor 15 as required.

The emission of light of the light-emitting diode 9 is controlled not by the voltage across the capacitor 15 which decreases after discharging but by the light emission control signal which is output by the comparator 19 according to the result of a comparison between the reference voltage and the voltage across the capacitor 15. In other words, even if there is a gradual reduction in the voltage across the capacitor 15, the comparator 19 outputs the "high-level" light emission control signal while the voltage across the capacitor 15 is higher than the reference voltage, so that the light-emitting diode 9 emits light. If the voltage across the capacitor 15 becomes lower than the reference voltage, the comparator 19 outputs the "low-level" light emission control signal, thereby interrupting the emission of light of the light-emitting diode 9. Consequently, a light-emitting state of the light-emitting diode 9 can be controlled relative to the reference voltage, and therefore the accuracy of the predetermined time period during which the light-emitting diode 9 continues emitting light can be improved.

Third Embodiment

Figure 5:
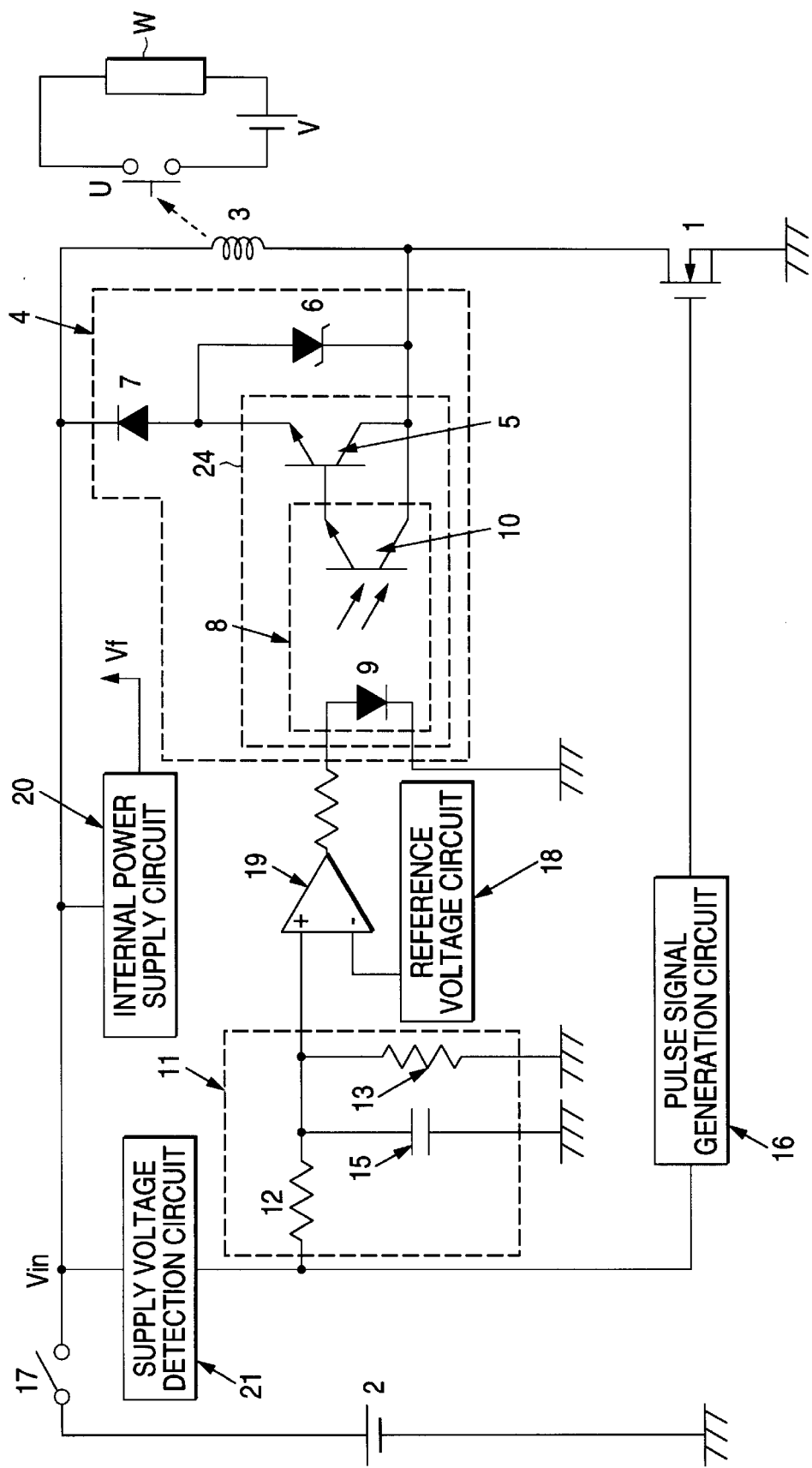
FIG. 5 is a circuit diagram illustrating the configuration of an electromagnet drive apparatus according to a third embodiment of the present invention.
Figure 6:
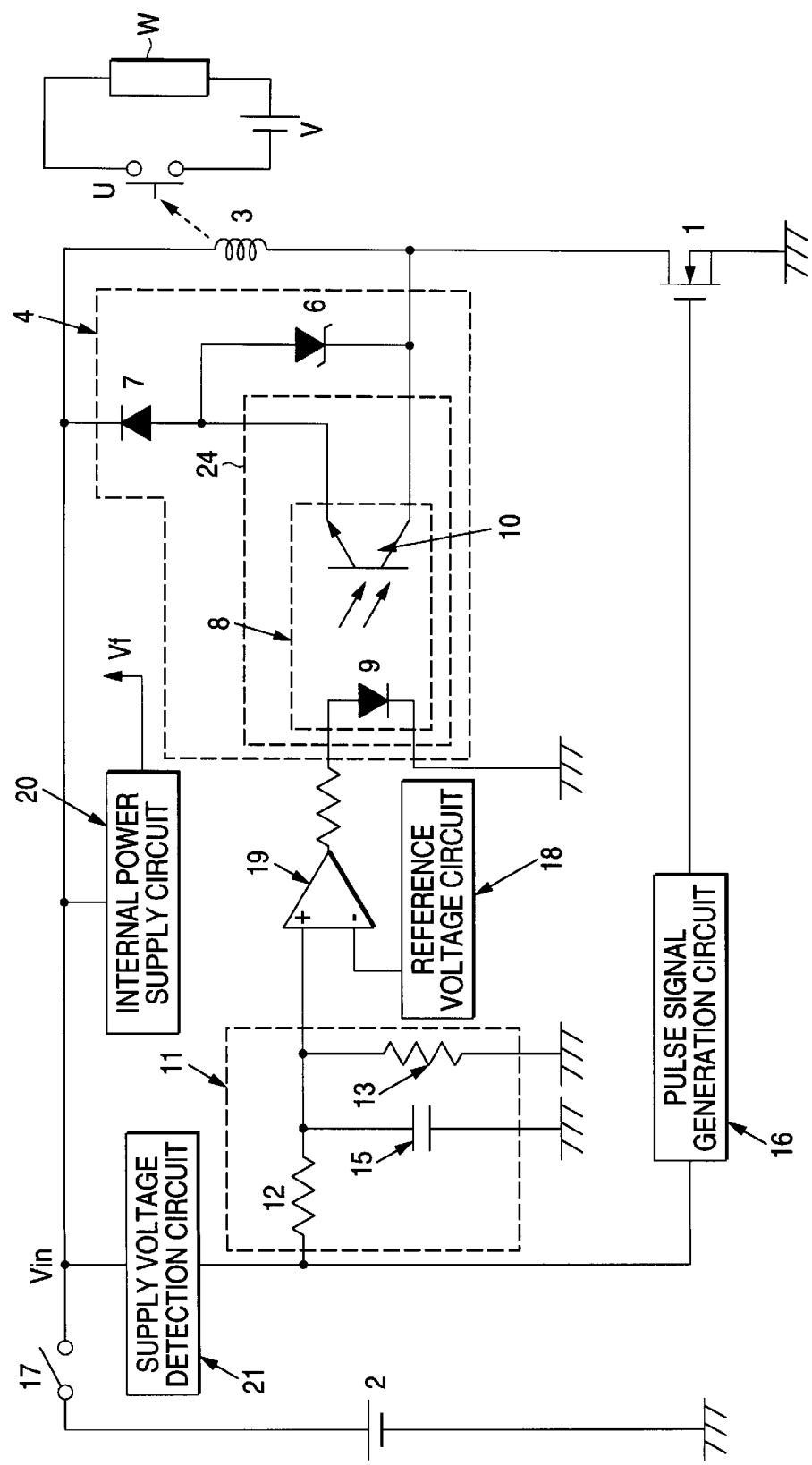
FIG. 6 is a circuit diagram illustrating the configuration of an electromagnet drive apparatus according to a modification of the present invention.
Figure 7:
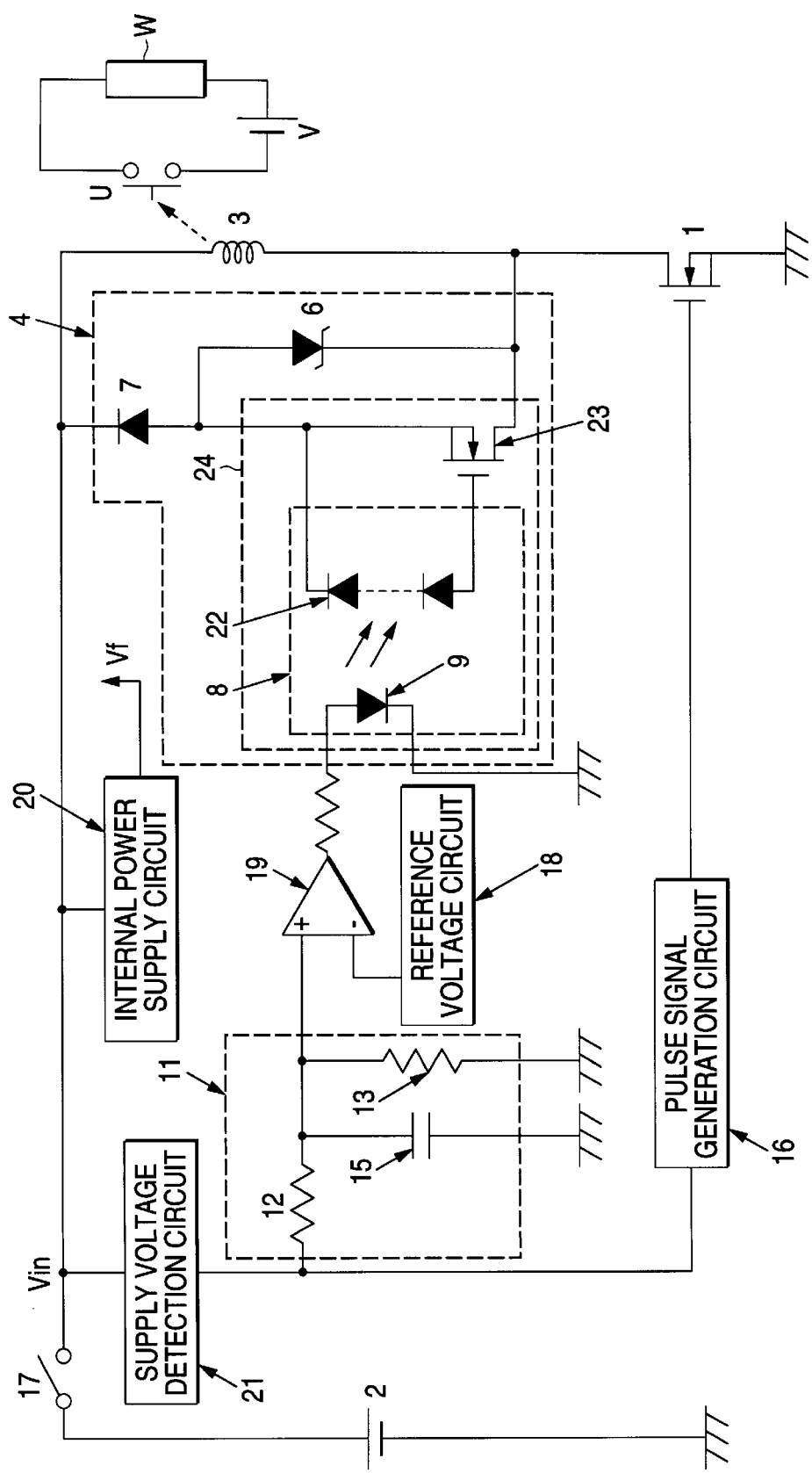
FIG. 7 is a circuit diagram illustrating the configuration of an electromagnet drive apparatus according to a modification of the present invention.
Figure 8:
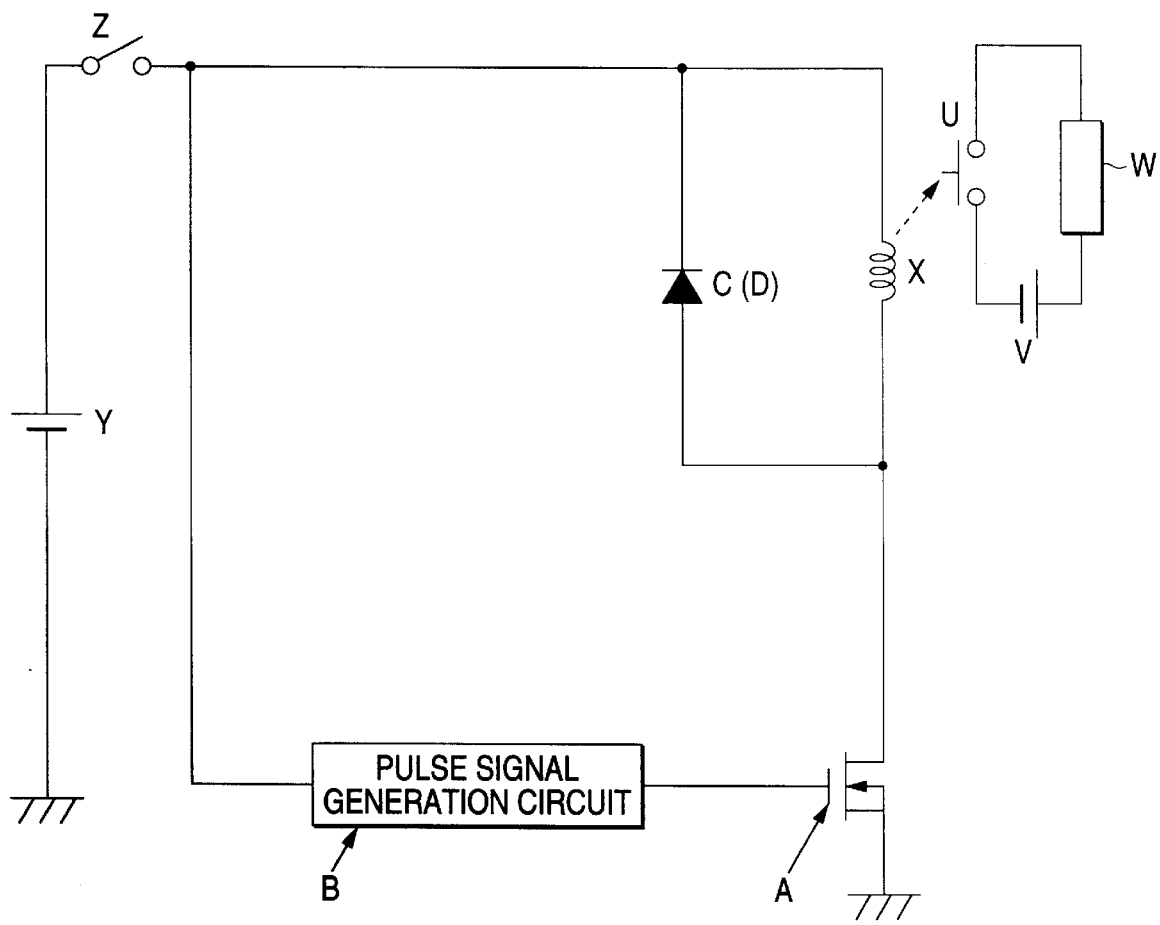
FIG. 8 is a circuit diagram illustrating the configuration of an electromagnet drive apparatus in the conventional art.
Figure 10:
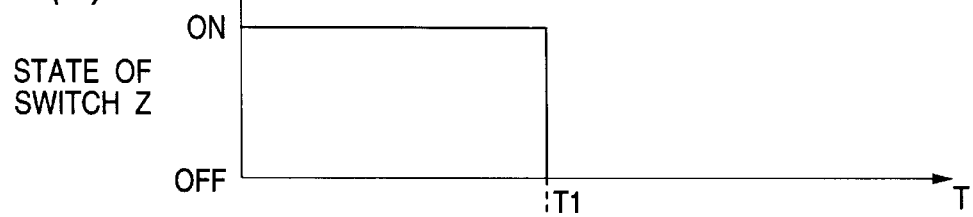
FIGS. 10(A) to 10(D) are timing charts of the electromagnet drive apparatus, wherein 10(A) represents the state of the switch which is switched to an off state from an on state during the course of an operation, 10(B) represents the state of the pulse signal, 10(C) represents the state of the electrical current flowing through the coil, and 10(D) represents the state of the contact; through the coil, and (D) represents the state of the contact.
Figure 10:
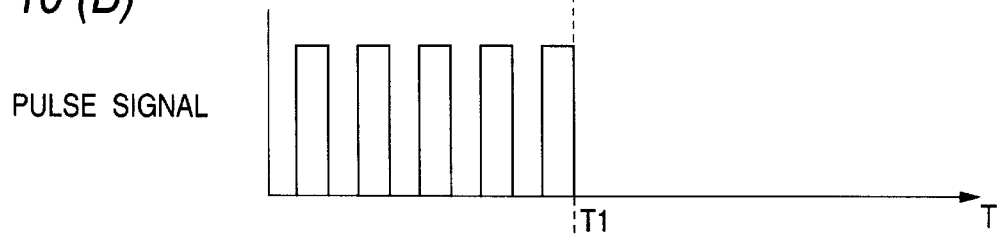
Figure 10:
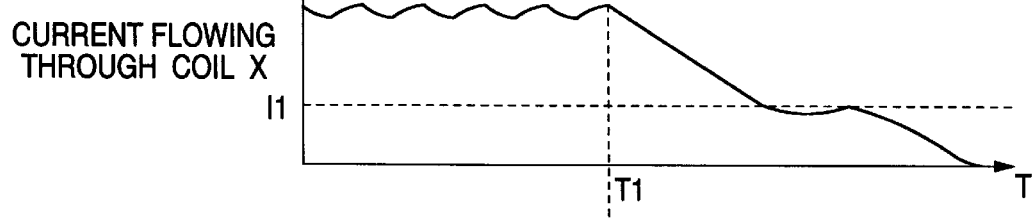
Figure 10:
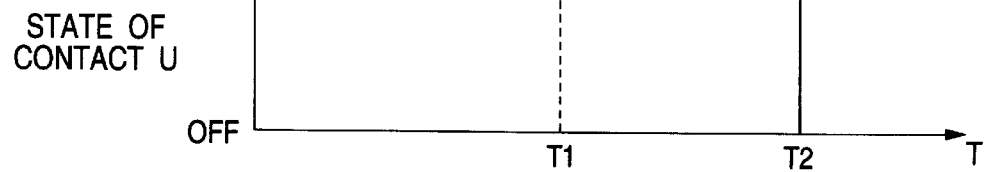
Figure 11:
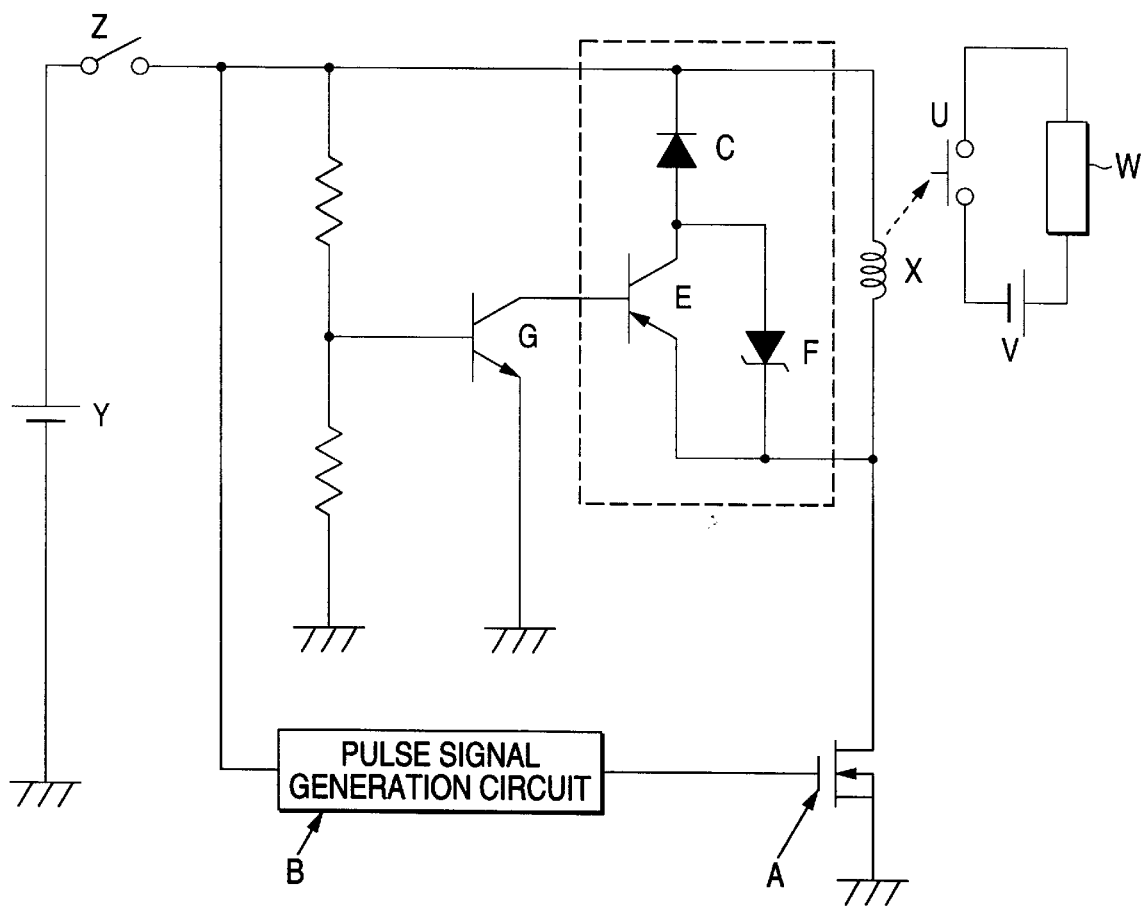
FIG. 11 is a circuit diagram illustrating the configuration of a conventional electromagnet drive apparatus.

FIGS. 5 through 7 are circuit diagrams illustrating the configuration of an electromagnet drive apparatus. In FIGS. 5 through 7, components having substantially the same features as those of the components in the second embodiment are assigned the same reference numerals, and only the different components are illustrated.

In contradistinction to the second embodiment in which the electromagnet drive apparatus is provided with the second Zener diode 14, the electromagnet drive apparatus according to a third embodiment is provided with a supply voltage detection circuit 21.

More specifically, the supply voltage detection circuit 21 is driven using the internal power supply circuit 20 as a stable power supply and detects the state of application of a voltage from the power supply 2. When there is application of the supply voltage Vin, the supply voltage detection circuit 21 outputs a "high-level" charge control signal which is made of the internal supply voltage Vf output from the internal power supply circuit 20 and has a given voltage. In contrast, when there is no application of the supply voltage Vin, the supply voltage detection circuit 21 outputs a "low-level" charge control signal having a given voltage. This supply voltage detection circuit 21 is connected to the respective terminals of the pulse signal generation circuit 16 and the charge resistor 12.

Next, the operation of the above-described electromagnet drive apparatus will be described. When the switch 17 is turned on, the supply voltage detection circuit 21 detects the state of application of the voltage from the power supply 2 and outputs the "high-level" charge control signal having a given voltage. The "high-level" charge control signal is applied across the capacitor 15, and the capacitor 15 is charged via the charge resistor 12 until the voltage across the capacitor 15 becomes equal to the voltage of the "high-level" charge control signal. During the course of the charging of the capacitor 15, the comparator 19 outputs from its output terminal the "high-level" light emission control signal when the charged voltage of the capacitor 15 becomes higher than the reference voltage of the reference voltage circuit 18 connected to the invertible input terminal. The "high-level" light emission control signal is applied to the light-emitting diode 9, so that the light-emitting diode 9 emits light. As a result, the phototransistor 10 is turned on, which in turn turns on the second transistor 5.

As in the case of the second embodiment, while the switch 17 is in an on state, the pulse signal generation circuit 16 operates and produces a pulse signal simultaneously with the series of above-described operations. The first transistor 1 is turned on or off, whereby the electrical current flowing to the coil 3 is controlled in a chopping manner and is maintained at substantially a constant value. As a result, the electromagnet is maintained in an on state.

Next, when the switch 17 is turned off, the supply voltage detection circuit 21 detects the state of application of a voltage from the power supply 2 and outputs the "low-level" charge control signal having a given voltage. The operation of the pulse signal generation circuit 16 is stopped, and the first transistor 1 is turned off. Simultaneously with the series of operations, the electrical charges stored in the capacitor 15 are discharged via the discharge resistor 13. Therefore, the voltage across the capacitor 15 decreases to zero from the voltage of the "high-level" charge control signal. As in the case of the second embodiment, the electromagnet is maintained in the on state.

If a predetermined time has elapsed while the switch 17 is in an off state, and if the voltage across the capacitor 15 becomes lower than the reference voltage, the energy stored in the coil 3 is consumed by flowing an electrical current to a series circuit which consists of the first Zener diode 6 and the diode 7 and is connected in parallel with the coil 3, as does in the second embodiment. The first Zener diode 6 consumes the energy stored in the coil 3 immediately, as a result of which the electrical current flowing through the coil 3 decreases immediately, thereby turning off the electromagnet.

Similar to the second embodiments, the electromagnet drive apparatus having the previously-described configuration is capable of turning off the electromagnet immediately at a desired time without a malfunction.

Further, as is the case with the first and second embodiments, since it is possible to control the light-emitting state of the light-emitting diode 9 relative to the reference voltage, it is possible to improve the accuracy of a predetermined time period during which the light-emitting diode 9 continues emitting light.

The charging state of the capacitor 15 is controlled not by the variable supply voltage Vin but by the charge control signal having a given voltage which is output by the supply voltage detection circuit 21 according to the state of application of a voltage from the power supply 2. Therefore, even if there are variations in the supply voltage Vin, the amount of electrical charges stored in the capacitor 15 becomes constant, thereby resulting in a constant amount of electrical charges discharged to the light-emitting diode 9 after the application of the power has been stopped. As a result, the discharge duration becomes constant. Accordingly, it is possible to control the predetermined time period during which the light-emitting diode 9 continues emitting light by setting the capacitance of the capacitor 15 as required.

Figure 22:
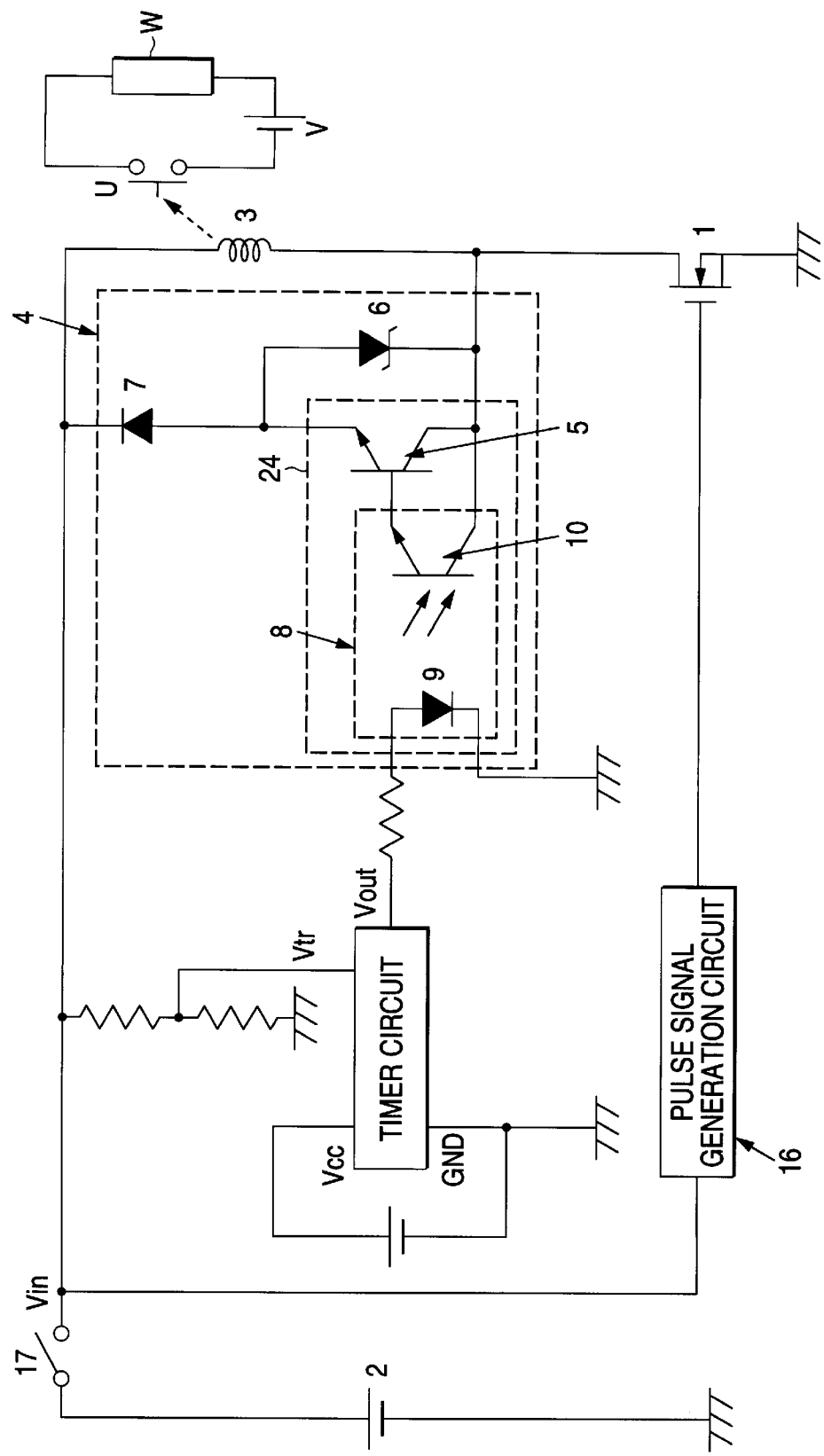
FIGS. 22 is a showing circuit diagrams of the present invention with the timer circuit.

Although the delay circuit 11 is provided with the capacitor 15 capable of being charged during the application of a voltage from the power supply 2 and of discharging an electrical current to the light-emitting diode 9 until a predetermined period of time has elapsed after the application of the voltage has been stopped in each of the previous first through third embodiments, the present invention is not limited to this type of delay circuit. The delay circuit may be formed from a power supply differing from the power supply 2 and a timer circuit as shown in FIG. 22.

Although the capacitor 5 of the delay circuit 11 is connected in parallel with the second Zener diode 14 in both the first and second embodiments, the second Zener diode 14 may not be connected in parallel with the capacitor 15; e.g., in a case where it is not required to very rigorously control the predetermined time period during which the light-emitting diode 9 continues emitting light. In this case, the number of parts can be reduced.

As illustrated in FIG. 6, the switch section 24 may be comprised of the phototransistor 10 which doubles as the second transistor 5 used in the first through third embodiments. In this case, for a case where a relatively current is applied to the coil 3, the second transistor 5 used in the first through third embodiments can be omitted, and hence the number of parts can be reduced.

As illustrated in FIG. 7, the switch section 24 may be comprised of the photodiode 22 without use of the phototransistor 10 used in the first through third embodiments. In this case, the photodiode 22 produces a voltage as a result of emission of light of the light-emitting diode 9, thereby turning on the field-effect transistor 23.

Figure 18:
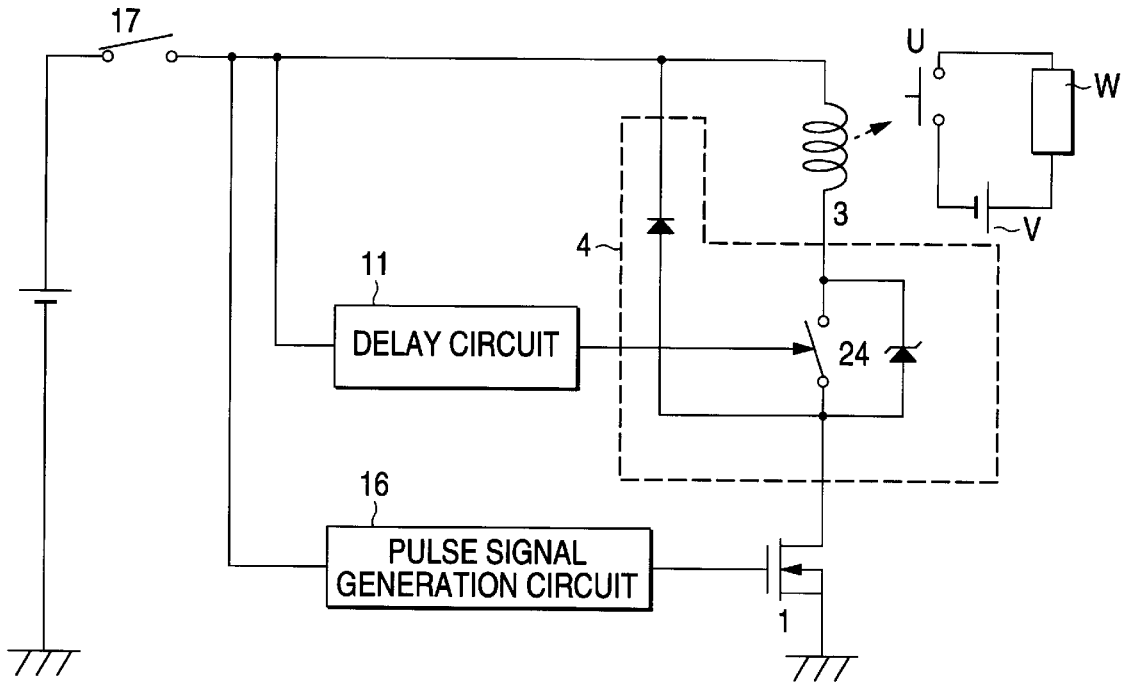
FIGS. 18 to 21 are shows circuit diagrams of the modified embodiments of the present invention.
Figure 19:
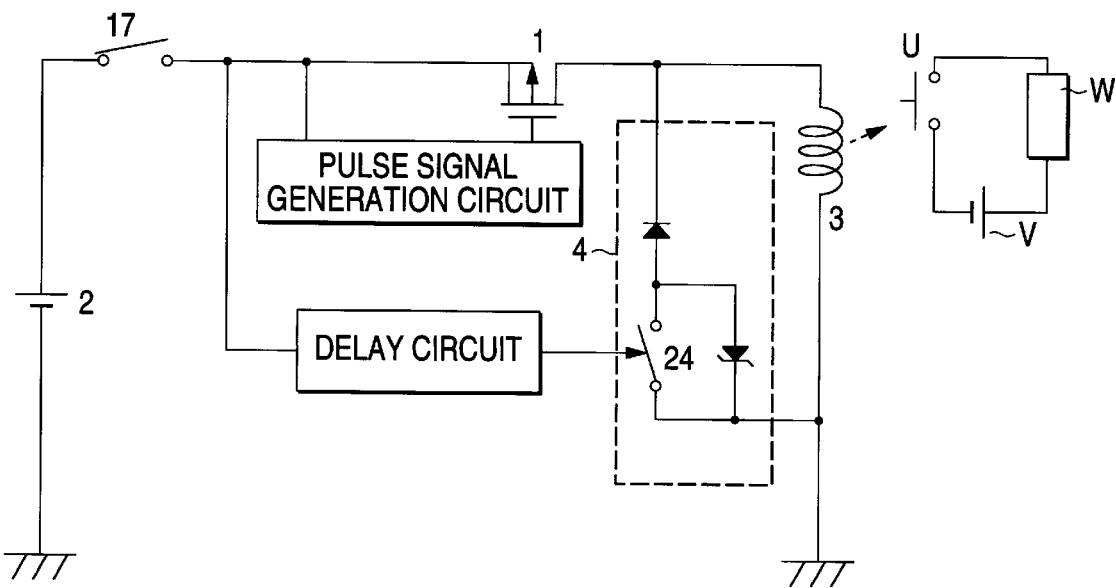
Figure 20:
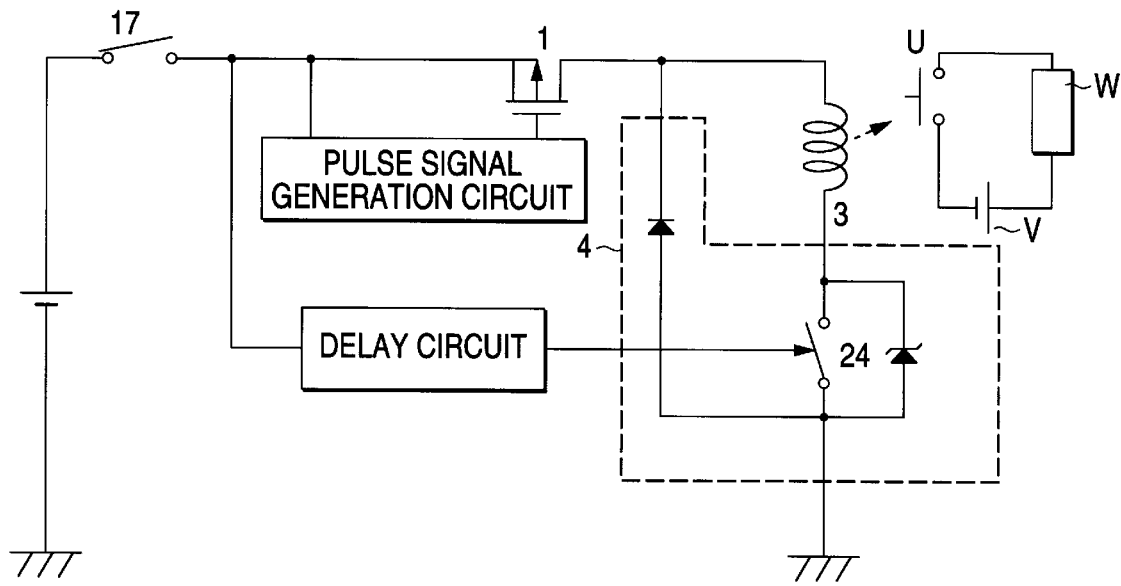
Figure 21:
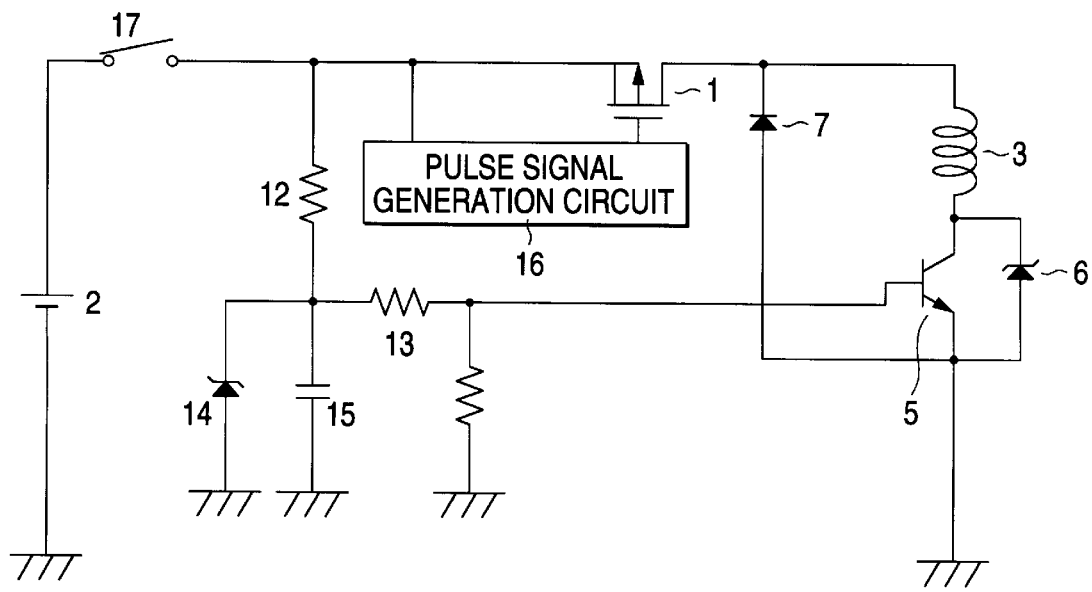

FIGS. 18 to 21. show modified examples based on the circuit diagram shown in FIG. 1 of the first embodiment. In FIG. 18, a connecting portion of a regenerative circuit switching portion is changed. In FIG. 19, the switching element is disposed on the positive side of the power source 2. In FIG. 20, a connecting portion of a regenerative circuit switching portion is changed and the switching element is disposed on the positive side of the power source 2. These circuits are also traced on the timing chart shown in FIGS. 2 (A) to (E) and FIGS. 3 (A) to (E). Specifically, photocoupler 8 is not always provided is the circuit diagram as shown in FIG. 18. More detailed circuit diagram relating to FIG. 20 is shown in FIG. 21. In these examples, when the regenerated electrical current flows, the regenerative circuits in circuit diagrams are in the same construction.

The operation of the device in FIG. 21 are as follows. When the power source voltage is applied, a base current is supplied from the power source through the resistor 13 to turn on the transistor 5 so that the coil current is controlled in a switching operation. When the application of the power source voltage is stopped, the electrical charges stored in the capacitor 15 is applied as the base current of the transistor 5. Thus, the transistor 5 is turned on in the predetermined time of period to suppress the attenuation of the coil current.

After passing the predetermined time of period from stopping the application of the power source voltage, the electrical charges stored in the capacitor 15 is decreased. Thus, it is impossible to supply the base current which maintains the transistor in turning on state to the transistor. Then, the transistor turns off and the coil current is rapidly attenuated through the Zener diode.

It is capable for replacing the transistor 5 by FET. If the FET is employed, the electrical charges is stored in the capacitor 15. Thus, before passing the predetermined time of period from stopping the application of the power source voltage, it is possible to supply the voltage to the gate of the FET to turn on the FET in the predetermined the time of period. After passing the predetermined time of period, the electrical charges stored in the capacitor 15 is discharged to decrease the voltage applied to the gate so as to turn off the FET. In general, the photocoupler 8 is expensive. When the FET is employed to decrease manufacturing cost.

The concept of the modified Examples are also applicable for second and third embodiment of the present invention.

The following other embodiments also achieve the object of the present invention.

Figure 23:
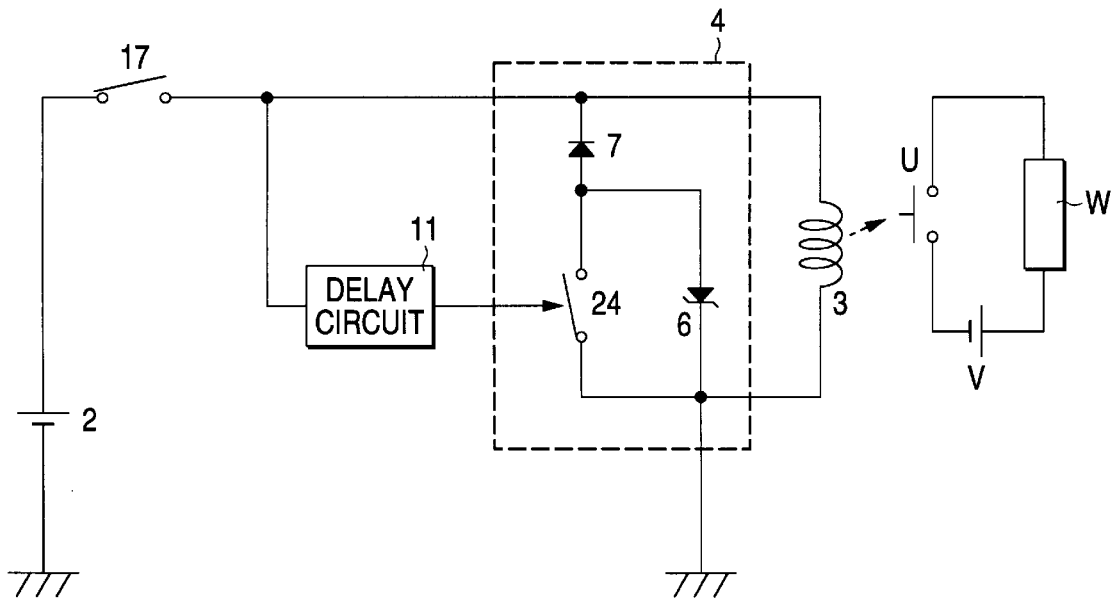
FIGS. 23 and 24 are shows circuit diagrams of another modified embodiments of the present invention.
Figure 24:
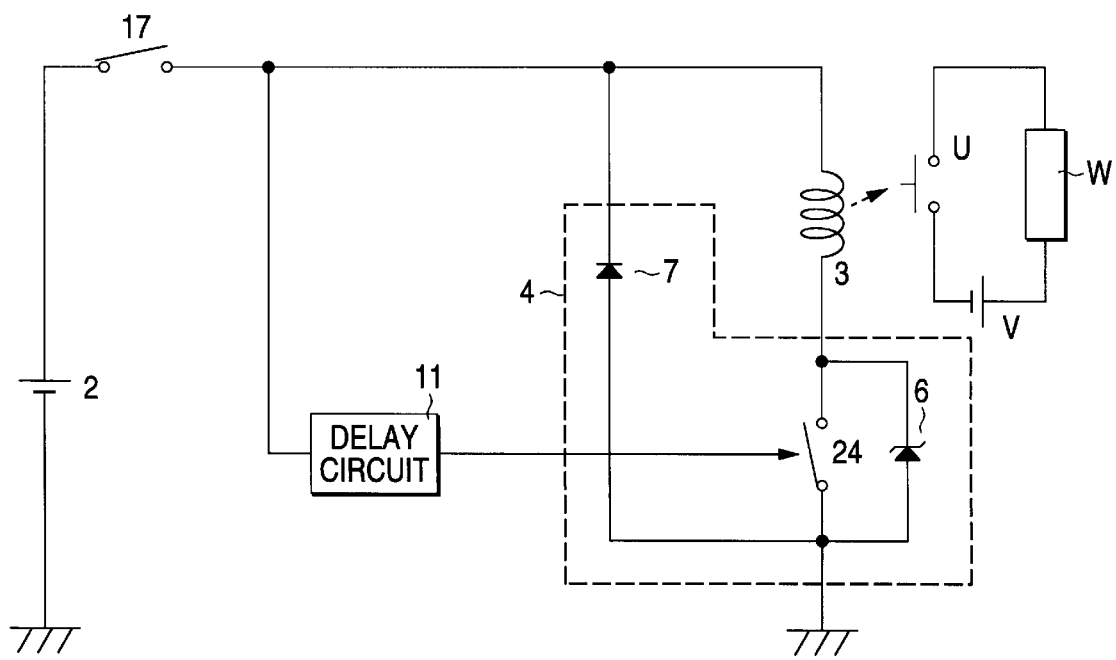

In FIGS. 23 and 24 showing another embodiments of the present invention, components which have substantially the same features as those of the components in the first embodiment of the present invention as shown in FIG. 1 are the same numerals, except of omitting the pulse signal generation circuit 16 and the photocoupler 8 from the switch portion 24.

The operation of the device in FIGS. 23 and 24 are as the same. when the application of the voltage from the power supply 2 is stopped, the regenerating electrical current flows through the switch portion 24 and the regenerative diode to suppress the attenuation of the coil current. After that, when a predetermined time of period is expired, the switch 2 turns off so that the regenerated electrical current flows through the Zener diode to rapidly attenuate the coil current.

FIGS. 25 (A) to (C) show timing charts of the electromagnet drive apparatus in a normal turning off state of the switch 17. As similar to the first embodiment of the present invention, a time of period T10' is in 1.5 msec from the time T8'.

FIGS. 26 (A) to (C) show timing charts of the electromagnet drive apparatus in a unintentional and momentarily interruption of the application of a voltage from the power supply. As similar to the first embodiment of the present invention, a time of period T11' is in 1 msec from the time T8'. In general, the photocoupler 8 is expensive. When the photocoupler 8 is omitted to decrease manufacturing cost.

In these embodiments, the switching frequency and the delay time are set in 20 kHz and 1.5 msec. However, the present invention is not limited by these values. These value are changed in view of the inductance and the resistance of the electromagnetic coil. When the resistance of the electromagnetic coil is lower than that of the inductance, the energy consumed by the resistance of the coil is in small and the energy stored in the coil is in large due to the large coil inductance. Thus, there is increased the attenuation amount of the regenerated electrical current on time processing basis in the off state (regenerative mode). Namely, a time for reaching the coil current to the current for opening the electromagnet from turning off the switching becomes in long so that the switching frequency is in small and the delay time is set in the long time of period.

Further, under the condition that the heat generation of the electromagnet do not cause the problem, if an average current of the coil holding the electromagnet becomes in large, a time for reaching the coil current to the current for opening the electromagnet from turning off the switching becomes in long so that the switching frequency is in small and the delay time is set in the long time of period.

According to the present invention, even if there is momentarily and unintentional interruption of application of a supply voltage, a delay circuit continuously maintain a switch section in an on state until a predetermined time period elapses even when the application of the supply voltage is momentarily interrupted. An electrical current flowing through a coil is regenerated by flowing through the switch section using a counter electromotive force developed in the coil as a supply source, thereby energizing the coil continuously. As a result, an electromagnet can be maintained in an on state. Further, after the predetermined time period has elapsed, the electrical current flowing through the coil is regenerated by flowing into a power absorbing element of a regenerative circuit, using the counter electromotive force developed in the coil as the supply source. Then, the thus-regenerated electrical current decreases immediately. Consequently, the driving of the electromagnet can be terminated immediately at a desired time, and the coil current can be attenuated immediately. For these reasons, a contact opening speed of the relay can be improved, and the breaking capability of the relay is also improved. Further, even if there is unintentional and momentarily interruption of a supply voltage, the electromagnet is prevented from erroneously opening.

According to the present invention, the switch section is comprised of a transistor connected in parallel with the power absorbing element, a phototransistor connected between a base and a collector of the transistor, and a light-emitting diode which emits light so as to control the switching on or off of the phototransistor. By virtue of this configuration, there is achieved an effect of being possible to use a regenerated electrical current as a base current for driving the transistor when there is interruption of application of the supply voltage, thereby enabling the transistor to operate without need of a separate power supply for driving the transistor.

According to the present invention, even if there is momentarily and unintentional interruption of application of a supply voltage, a delay circuit continues supplying an electrical current to a light-emitting diode until a predetermined time period elapses, thereby maintaining the light-emitting diode in a light-emitting state. Resultingly, the phototransistor is maintained in an on state, turning on the transistor. Then, the regenerated electrical current flows to the coil, and the coil is maintained in an excited state continuously. Further, after the predetermined time period has elapsed, the electrical current flowing through the coil is regenerated by flowing into a power absorbing element of a regenerative circuit, using the counter electromotive force developed in the coil as the supply source. Then, the thus-regenerated electrical current decreases immediately. Consequently, the driving of the electromagnet can be terminated immediately at a desired time, and the coil current can be attenuated immediately. For these reasons, a contact opening speed of the relay can be improved, and the breaking capability of the relay is also improved. Further, even if there is unintentional and momentarily interruption of a supply voltage, the electromagnet is prevented from erroneously opening.

According to the present invention, the voltage across the capacitor connected in parallel with a Zener diode is maintained at a Zener voltage even when there are variations in the supply voltage. By virtue of this configuration, there is achieved an effect of charging of the capacitor with a constant amount of electrical charges, resulting in a constant electrical current flowing toward the light-emitting diode after the application of a voltage has been stopped. Therefore, a discharge duration becomes constant. Accordingly, a predetermined time period during which the light-emitting diode continues emitting light can be controlled by setting the capacitance of the capacitor as required.

According to the present invention, a charging state of the capacitor is controlled not by the variable supply voltage but by a charge control signal having a constant voltage which is output by a supply voltage detection circuit according to the state of application of a supply voltage. By virtue of this configuration, there is achieved an effect of charging of the capacitor with a constant amount of electrical charges, resulting in a constant electrical current flowing toward the light-emitting diode after the application of a voltage has been stopped. Therefore, a discharge duration becomes constant. Accordingly, a predetermined time period during which the light-emitting diode continues emitting light can be controlled by setting the capacitance of the capacitor as required.

According to the present invention, a light-emitting state of the light-emitting diode is controlled not by a voltage across the capacitor which decreases after discharging but by a light emission control signal which is output by a comparator according to the result of a comparison between a reference voltage and the voltage across the capacitor. By virtue of this configuration, there is achieved an effect of being possible to momentarily control the state of light emission of the light-emitting diode through use of the light emission control signal even if there is a gradual reduction in the voltage across the capacitor. Therefore, the accuracy of the predetermined time period during which the light-emitting diode continues emitting light can be improved.

What is claimed is:

1. An electromagnet drive apparatus comprising:

an electromagnet with a coil;

a regenerative circuit for permitting a flow of a regenerated electrical current when the application of a voltage to said electromagnet drive apparatus is stopped, and for attenuating said regenerated electrical current after a predetermined time period elapses after the application of said voltage to said electromagnet drive apparatus is stopped;

a delay circuit for maintaining said regenerating circuit in an on state until said predetermined time period elapses after the application of said voltage to said electromagnet drive apparatus is stopped;

a switching element connected in series with said coil of said electromagnet; and a pulse signal generation circuit for generating, on predetermined cycles, a pulse signal used for turning on the switching element, wherein said regenerative circuit includes a switch portion and a power absorbing element forming a parallel circuit and a diode connected in series to said parallel circuit, and wherein said regenerative circuit permits flow of said regenerated electrical current to said coil when said switch portion is turned on and said switching element is turned off from a state in which the switch portion and the switching element are in said on state, and which causes said power absorbing element to immediately reduce said regenerated electrical current flowing through said coil of said electromagnet when said switch portion and said switching element are turned off, and wherein the switch portion includes:
a transistor
a phototransistor connected between a base and a collector of said transistor; and
a light-emitting diode for emitting light so as to control the switching on or off of said phototransistor.

2. An electromagnet drive apparatus comprising:

an electromagnet with a coil;

a regenerative circuit for permitting a flow of a regenerated electrical current when the application of a voltage to said electromagnet drive apparatus is stopped, and for attenuating said regenerated electrical current after a predetermined time period elapses after the application of said voltage to said electromagnet drive apparatus is stopped;

a delay circuit for maintaining said regenerating circuit in an on state until said predetermined time period elapses after the application of said voltage to said electromagnet drive apparatus is stopped;

a switching element connected in series with said coil of said electromagnet; and a pulse signal generation circuit for generating, on predetermined cycles, a pulse signal used for turning on the switching element, wherein said regenerative circuit includes a switch portion and a power absorbing element forming a parallel circuit and a diode connected in series to said parallel circuit, and wherein said regenerative circuit permits flow of said regenerated electrical current to said coil when said switch portion is turned on and said switching element is turned off from a state in which the switch portion and the switching element are in said on state, and which causes said power absorbing element to immediately reduce said regenerated electrical current flowing through said coil of said electromagnet when said switch portion and said switching element are turned off, and wherein said delay circuit includes a capacitor, which is capable of being charged during the application of said voltage to said electromagnet drive apparatus and discharging an electrical current to said switch portion until said predetermined time period elapses after the application of said voltage to said electromagnet drive apparatus is stopped, and a Zener diode connected in parallel with the capacitor.

3. An electromagnet drive apparatus comprising:

an electromagnet with a coil;

a regenerative circuit for permitting a flow of a regenerated electrical current when the application of a voltage to said electromagnet drive apparatus is stopped, and for attenuating said regenerated electrical current after a predetermined time period elapses after the application of said voltage to said electromagnet drive apparatus is stopped;

a delay circuit for maintaining said regenerating circuit in an on state until said predetermined time period elapses after the application of said voltage to said electromagnet drive apparatus is stopped;

a switching element connected in series with said coil of said electromagnet; and a pulse signal generation circuit for generating, on predetermined cycles, a pulse signal used for turning on the switching element, wherein said regenerative circuit includes a switch portion and a power absorbing element forming a parallel circuit and a diode connected in series to said parallel circuit, and wherein said regenerative circuit permits flow of said regenerated electrical current to said coil when said switch portion is turned on and said switching element is turned off from a state in which the switch portion and the switching element are in said on state, and which causes said Power absorbing element to immediately reduce said regenerated electrical current flowing through said coil of said electromagnet when said switch portion and said switching element are turned off, and wherein the delay circuit includes a capacitor which is capable of being charged during the application of said voltage to said electromagnet drive apparatus and discharging an electrical current to said switch portion until said predetermined time period elapses after the application of said voltage to said electromagnet drive apparatus is stopped; and further comprising:

a source voltage detection circuit for applying a predetermined charging voltage to said capacitor if a source voltage is higher than a predetermined voltage and for terminating the application of said predetermined charging voltage to the capacitor if the source voltage is lower than said predetermined voltage, by stopping the pulse signal generation circuit.

4. The electromagnet drive apparatus according to claim 2 further comprising:

a reference voltage circuit for outputting a reference voltage; and a comparator for comparing said reference voltage with the voltage across the capacitor and for outputting a control signal for controlling the switching on or off of said switch portion.

5. An electromagnet drive apparatus comprising:

an electromagnet with a coil;

a regenerative circuit for permitting a flow of a regenerated electrical current when the application of a voltage to said electromagnet drive apparatus is stopped, and for attenuating said regenerated electrical current after a predetermined time period elapses after the application of said voltage to said electromagnet drive apparatus is stopped;

a delay circuit for maintaining said regenerating circuit in an on state until said predetermined time Period elapses after the application of said voltage to said electromagnet drive apparatus is stopped;

a switching element connected in series with said coil of an electromagnet;

a pulse signal generation circuit for generating, on predetermined cycles, a pulse signal used for turning on the switching element; and a diode connected in parallel to a series circuit connecting a power absorbing element and said coil, wherein said regenerative circuit includes a switch portion connected in parallel with said power absorbing element and said diode connected in parallel with said series circuit.

* * * * *